US009863695B2

(12) United States Patent
Alexander et al.

(10) Patent No.: US 9,863,695 B2
(45) Date of Patent: Jan. 9, 2018

(54) HEATED OR COOLED DRINKWARE

(71) Applicant: Ember Technologies, Inc., Westlake Village, CA (US)

(72) Inventors: Clayton Alexander, Westlake Village, CA (US); Christopher Thomas Wakeham, Solana Beach, CA (US); Daren John Leith, Agoura Hills, CA (US); Mikko Juhani Timperi, San Marcos, CA (US); Frank Victor Baumann, San Diego, CA (US)

(73) Assignee: Ember Technologies, Inc., Westlake Village, CA (US)

( * ) Notice: Subject to any disclaimer, the term of this patent is extended or adjusted under 35 U.S.C. 154(b) by 0 days.

(21) Appl. No.: 15/583,217

(22) Filed: May 1, 2017

(65) Prior Publication Data

US 2017/0314851 A1 Nov. 2, 2017

Related U.S. Application Data

(60) Provisional application No. 62/330,426, filed on May 2, 2016.

(51) Int. Cl.
*F25D 3/08* (2006.01)
*F25D 31/00* (2006.01)
(Continued)

(52) U.S. Cl.
CPC ....... *F25D 31/005* (2013.01); *A47G 19/2288* (2013.01); *F25D 3/08* (2013.01);
(Continued)

(58) Field of Classification Search
CPC ............................. F25D 3/08; F25D 2331/804
(Continued)

(56) References Cited

U.S. PATENT DOCUMENTS 1,721,311 A 7/1929 Muenchen
3,064,113 A 11/1962 Pitrone
(Continued)

FOREIGN PATENT DOCUMENTS

CH 631614 8/1982
CN 1338240 A 3/2002
(Continued)

OTHER PUBLICATIONS

Decision of Rejection dated Apr. 4, 2017 in JP Application No. 2013-537797.
(Continued)

*Primary Examiner* — Melvin Jones
(74) *Attorney, Agent, or Firm* — Knobbe, Martens, Olson & Bear LLP

(57) ABSTRACT

A container with active temperature control is provided. The container has a body with a chamber that receives a liquid. A temperature control system housed in the portable body has one or more heating element in thermal communication with at least a portion of the chamber to heat the liquid. Control circuitry controls the operation of the one or more heating elements and one or more power storage elements to provide electrical energy to the one or more heating element and/or control circuitry. The control circuitry controls the one or more heating elements to add heat to the liquid in the receiving portion to maintain the temperature of the liquid at a predetermined temperature or increase the temperature of the liquid above said predetermined temperature. The container can have a cooling element (e.g., a phase change material) that can remove heat from the liquid poured into the chamber.

29 Claims, 12 Drawing Sheets

(51) Int. Cl.
  *F25D 29/00* (2006.01)
  *A47G 19/22* (2006.01)
  *G06Q 20/32* (2012.01)

(52) U.S. Cl.
  CPC ......... *F25D 29/003* (2013.01); *F25D 31/002* (2013.01); *G06Q 20/327* (2013.01); *F25D 2303/0831* (2013.01); *F25D 2400/02* (2013.01); *F25D 2400/361* (2013.01)

(58) Field of Classification Search
  USPC .. 62/457.1, 457.2, 457.5, 457.6, 457.7, 371, 62/530
  See application file for complete search history.

(56) References Cited

U.S. PATENT DOCUMENTS

| | | | |
|---|---|---|---|
| 3,463,140 A | 8/1969 | Rollor | |
| 3,603,106 A | 9/1971 | Ryan et al. | |
| 3,622,753 A | 11/1971 | Lax | |
| 3,676,248 A | 7/1972 | Swartz | |
| 3,678,248 A | 7/1972 | Tricault et al. | |
| 3,739,148 A | 6/1973 | Ryckman, Jr. | |
| 3,766,975 A | 10/1973 | Todd | |
| 3,797,563 A | 3/1974 | Hoffmann et al. | |
| 3,892,945 A | 7/1975 | Lerner | |
| 3,931,494 A | 1/1976 | Fisher et al. | |
| 4,068,115 A | 1/1978 | MacK et al. | |
| 4,095,090 A | 6/1978 | Pianezza | |
| 4,134,004 A | 1/1979 | Anderson et al. | |
| 4,442,343 A | 4/1984 | Genuit et al. | |
| D296,509 S | 7/1988 | Fuke | |
| 4,801,782 A | 1/1989 | Ineson | |
| 4,827,107 A | 5/1989 | Peery | |
| 4,980,539 A | 12/1990 | Walton | |
| 4,982,722 A | 1/1991 | Wyatt | |
| 4,983,798 A | 1/1991 | Eckler | |
| 5,042,258 A | 8/1991 | Sundhar | |
| 5,090,209 A | 2/1992 | Martin | |
| 5,163,290 A | 11/1992 | Kinnear | |
| 5,199,275 A | 4/1993 | Martin | |
| 5,208,896 A | 5/1993 | Katayev | |
| 5,217,064 A * | 6/1993 | Kellow | A61J 1/165 165/254 |
| 5,243,684 A | 9/1993 | Edwards | |
| 5,274,215 A | 12/1993 | Jackson | |
| 5,283,420 A | 2/1994 | Montalto | |
| 5,313,787 A | 5/1994 | Martin | |
| 5,343,368 A | 8/1994 | Miller | |
| 5,388,565 A | 2/1995 | Ou | |
| 5,448,809 A | 9/1995 | Kraus | |
| 5,497,883 A | 3/1996 | Monetti | |
| 5,508,494 A | 4/1996 | Sarris et al. | |
| 5,550,452 A | 8/1996 | Shirai et al. | |
| 5,603,220 A * | 2/1997 | Seaman | A61J 1/165 62/3.62 |
| 5,603,858 A | 2/1997 | Wyatt et al. | |
| 5,643,485 A | 7/1997 | Potter et al. | |
| 5,678,925 A | 10/1997 | Garmaise et al. | |
| 5,737,923 A | 4/1998 | Gilley | |
| 5,786,643 A | 7/1998 | Wyatt et al. | |
| 5,842,353 A | 12/1998 | Kuo-Liang | |
| 5,884,006 A | 3/1999 | Frohlich et al. | |
| 5,903,133 A | 5/1999 | Amero, Jr. et al. | |
| 5,948,301 A | 9/1999 | Liebermann | |
| 5,954,984 A | 9/1999 | Ablah et al. | |
| 5,959,433 A | 9/1999 | Rohde | |
| 6,005,233 A | 12/1999 | Wyatt | |
| 6,013,901 A | 1/2000 | Lavoie | |
| 6,032,481 A | 3/2000 | Mosby | |
| 6,042,720 A | 3/2000 | Reber | |
| 6,072,161 A | 6/2000 | Stein | |
| 6,075,229 A | 6/2000 | Vanselow | |
| 6,108,489 A | 8/2000 | Frohlich et al. | |
| 6,110,159 A | 8/2000 | Tsujita | |
| 6,123,065 A | 9/2000 | Teglbjarg | |
| 6,140,614 A | 10/2000 | Padamsee | |
| 6,144,016 A | 11/2000 | Garvin | |
| 6,158,227 A * | 12/2000 | Seeley | G01K 1/14 340/585 |
| 6,180,003 B1 | 1/2001 | Reber et al. | |
| 6,212,959 B1 | 4/2001 | Perkins | |
| 6,232,585 B1 | 5/2001 | Clothier | |
| RE37,213 E | 6/2001 | Staggs | |
| 6,274,856 B1 | 8/2001 | Clothier | |
| 6,279,470 B2 | 8/2001 | Simeray et al. | |
| 6,281,611 B1 | 8/2001 | Chen et al. | |
| 6,314,867 B1 | 11/2001 | Russell | |
| 6,316,753 B2 | 11/2001 | Clothier | |
| 6,320,169 B1 | 11/2001 | Clothier | |
| 6,350,972 B1 | 2/2002 | Wright | |
| 6,353,208 B1 | 3/2002 | Bostic | |
| 6,376,803 B1 | 4/2002 | Klinger | |
| 6,384,387 B1 | 5/2002 | Owens | |
| 6,403,928 B1 | 6/2002 | Ford | |
| 6,414,278 B1 | 7/2002 | Frohlich et al. | |
| 6,415,624 B1 | 7/2002 | Connors et al. | |
| 6,427,863 B1 | 8/2002 | Nichols | |
| 6,444,961 B2 | 9/2002 | Clothier | |
| 6,555,789 B2 | 4/2003 | Owens | |
| 6,571,564 B2 | 6/2003 | Upadhye et al. | |
| 6,584,374 B2 | 6/2003 | Lee et al. | |
| 6,634,417 B1 | 10/2003 | Kolowich | |
| 6,657,170 B2 | 12/2003 | Clothier | |
| 6,662,978 B2 | 12/2003 | Lin et al. | |
| 6,664,520 B2 | 12/2003 | Clothier | |
| 6,674,052 B1 | 1/2004 | Luo | |
| 6,702,138 B1 | 3/2004 | Bielecki et al. | |
| 6,703,590 B1 | 3/2004 | Holley, Jr. | |
| 6,818,867 B2 | 11/2004 | Kressmann | |
| 6,852,954 B1 | 2/2005 | Liu et al. | |
| 6,864,462 B2 | 3/2005 | Sanoner et al. | |
| 6,870,135 B2 | 3/2005 | Hamm et al. | |
| 6,953,913 B1 | 10/2005 | Hara et al. | |
| 6,968,888 B2 | 11/2005 | Kolowich | |
| 7,002,111 B2 | 2/2006 | Bauer | |
| 7,022,946 B2 | 4/2006 | Sanoner et al. | |
| 7,034,256 B1 | 4/2006 | Phillips | |
| 7,059,387 B2 | 6/2006 | Kolowich | |
| 7,073,678 B1 | 7/2006 | Dibdin et al. | |
| 7,091,455 B2 | 8/2006 | Fung | |
| 7,109,445 B2 | 9/2006 | Patterson et al. | |
| 7,193,190 B2 | 3/2007 | Kissel, Jr. | |
| 7,208,707 B2 | 4/2007 | Clothier | |
| 7,212,955 B2 | 5/2007 | Kirshenbau et al. | |
| 7,227,108 B2 | 6/2007 | Clothier | |
| 7,263,283 B2 | 8/2007 | Knepler | |
| 7,276,676 B1 | 10/2007 | Thompson | |
| 7,287,386 B2 | 10/2007 | Upadhye et al. | |
| 7,414,380 B2 | 8/2008 | Tang et al. | |
| 7,419,073 B2 * | 9/2008 | Crisp, III | B67D 1/0057 222/129.1 |
| 7,431,174 B2 | 10/2008 | Thissen | |
| 7,571,830 B2 | 8/2009 | Lin | |
| 7,659,493 B2 | 2/2010 | Reusche et al. | |
| 7,681,754 B1 | 3/2010 | Ross | |
| 7,683,572 B2 | 3/2010 | Toya | |
| 7,815,067 B2 | 10/2010 | Matsumoto et al. | |
| 7,836,722 B2 | 11/2010 | Magill et al. | |
| 7,934,537 B2 | 5/2011 | Kolowich | |
| 7,942,145 B2 | 5/2011 | Palena et al. | |
| 7,948,209 B2 | 5/2011 | Jung | |
| 7,997,786 B2 | 8/2011 | Liu | |
| 8,055,310 B2 | 11/2011 | Beart et al. | |
| 8,061,149 B1 * | 11/2011 | Gowans | A61J 1/165 62/3.62 |
| 8,076,620 B2 | 12/2011 | Maupin et al. | |
| 8,205,468 B2 | 6/2012 | Hemminger et al. | |
| 8,272,532 B2 | 9/2012 | Michaelian et al. | |
| 8,274,016 B2 | 9/2012 | Montana | |
| 8,280,453 B2 | 10/2012 | Beart et al. | |
| 8,319,154 B2 | 11/2012 | Shaikh et al. | |
| 8,336,729 B2 | 12/2012 | Kelly et al. | |
| 8,400,104 B2 | 3/2013 | Adamczyk et al. | |

(56) References Cited

U.S. PATENT DOCUMENTS

| | | | |
|---|---|---|---|
| 8,448,809 B2 | 5/2013 | Kelly | |
| 8,467,669 B2 | 6/2013 | Widanagamage Don et al. | |
| 8,479,941 B2 | 7/2013 | Matsumoto et al. | |
| 8,618,448 B2 | 12/2013 | Alexander | |
| 8,759,721 B1 | 6/2014 | Alexander | |
| 8,907,796 B2 | 12/2014 | Sweeney et al. | |
| 9,035,222 B2 | 5/2015 | Alexander | |
| 9,351,600 B2 | 5/2016 | Rime | |
| 9,480,363 B2 | 11/2016 | Delattre | |
| 2001/0022304 A1 | 9/2001 | Roche | |
| 2001/0023866 A1 | 9/2001 | Wang | |
| 2002/0162339 A1 | 11/2002 | Harrison | |
| 2002/0175158 A1 | 11/2002 | Sanoner et al. | |
| 2003/0024250 A1 | 2/2003 | Haas | |
| 2003/0029662 A1 | 2/2003 | Piech | |
| 2003/0029862 A1 | 2/2003 | Clothier | |
| 2003/0066638 A1 | 4/2003 | Qu | |
| 2003/0145621 A1 | 8/2003 | Kidwell | |
| 2004/0004072 A1 | 1/2004 | Clothier | |
| 2004/0167592 A1 | 8/2004 | Grove | |
| 2004/0194470 A1 | 10/2004 | Upadhye et al. | |
| 2005/0045615 A1 | 3/2005 | Sanoner et al. | |
| 2005/0121431 A1 | 6/2005 | Yuen | |
| 2005/0242804 A1 | 11/2005 | Hintz | |
| 2006/0023480 A1 | 2/2006 | Plummer | |
| 2006/0081599 A1 | 4/2006 | Anderson | |
| 2006/0173259 A1 | 8/2006 | Flaherty | |
| 2006/0207442 A1 | 9/2006 | Pettersson | |
| 2006/0209628 A1 | 9/2006 | Jones | |
| 2006/0261233 A1 | 11/2006 | Williams et al. | |
| 2007/0092773 A1 | 4/2007 | Guo | |
| 2007/0151457 A1 | 7/2007 | Rabin et al. | |
| 2007/0182367 A1 | 8/2007 | Partovi | |
| 2007/0223895 A1 | 9/2007 | Flemm | |
| 2007/0278207 A1 | 12/2007 | Van Hoy | |
| 2007/0279002 A1 | 12/2007 | Partovi | |
| 2008/0011077 A1 | 1/2008 | Ramus et al. | |
| 2008/0019122 A1 | 1/2008 | Kramer | |
| 2008/0022696 A1 | 1/2008 | Welle | |
| 2008/0041859 A1 | 2/2008 | Teglbjarg | |
| 2008/0135564 A1 | 6/2008 | Romero | |
| 2008/0141681 A1 | 6/2008 | Arnold | |
| 2008/0149624 A1 | 6/2008 | Tamura | |
| 2008/0179311 A1 | 7/2008 | Koro et al. | |
| 2008/0213449 A1 | 9/2008 | Wisner et al. | |
| 2008/0251063 A1 | 10/2008 | Palena et al. | |
| 2008/0272134 A1 | 11/2008 | Rohe | |
| 2009/0102296 A1 | 4/2009 | Greene et al. | |
| 2009/0166350 A1 | 7/2009 | Ho | |
| 2009/0184102 A1 | 7/2009 | Parker, Jr. | |
| 2009/0230117 A1 | 9/2009 | Fernando | |
| 2010/0000980 A1 | 1/2010 | Popescu | |
| 2010/0108694 A1 | 5/2010 | Sedlbauer et al. | |
| 2010/0125417 A1 | 5/2010 | Hyde et al. | |
| 2010/0158489 A1 | 6/2010 | Siu et al. | |
| 2010/0186499 A1 | 7/2010 | Ramus et al. | |
| 2010/0251755 A1* | 10/2010 | Lauchnor ............ F25D 25/02 62/457.5 |
| 2010/0300913 A1 | 12/2010 | Goldburt | |
| 2011/0056215 A1 | 3/2011 | Ham et al. | |
| 2011/0062149 A1 | 3/2011 | Driel et al. | |
| 2011/0072978 A1 | 3/2011 | Popescu | |
| 2011/0121660 A1 | 5/2011 | Azancot et al. | |
| 2011/0152979 A1 | 6/2011 | Driscoll et al. | |
| 2011/0155621 A1 | 6/2011 | Lindquist et al. | |
| 2011/0174993 A1 | 7/2011 | Blain | |
| 2011/0180527 A1 | 7/2011 | Abbott | |
| 2011/0198255 A1 | 8/2011 | Baumfalk et al. | |
| 2011/0259871 A1 | 10/2011 | Li | |
| 2011/0265562 A1 | 11/2011 | Li | |
| 2012/0061050 A1 | 3/2012 | Petrillo et al. | |
| 2012/0064470 A1 | 3/2012 | Delattre et al. | |
| 2012/0082766 A1 | 4/2012 | Maupin et al. | |
| 2012/0090333 A1 | 4/2012 | DellaMorte et al. | |
| 2012/0103562 A1 | 5/2012 | Alexander | |
| 2012/0118874 A1 | 5/2012 | Williams et al. |
| 2012/0132646 A1 | 5/2012 | England et al. |
| 2012/0138597 A1 | 6/2012 | Quella et al. |
| 2012/0193999 A1 | 8/2012 | Zeine |
| 2012/0235505 A1 | 9/2012 | Schatz et al. |
| 2012/0235636 A1 | 9/2012 | Partovi |
| 2012/0248095 A1 | 10/2012 | Lee et al. |
| 2012/0248096 A1 | 10/2012 | Lee et al. |
| 2012/0255946 A1 | 10/2012 | Kim et al. |
| 2012/0256585 A1 | 10/2012 | Partovi et al. |
| 2012/0258229 A1 | 10/2012 | Mindrup |
| 2012/0319500 A1 | 12/2012 | Beart et al. |
| 2013/0059259 A1 | 3/2013 | Oldani |
| 2013/0103463 A1 | 4/2013 | Briar et al. |
| 2013/0167730 A1 | 7/2013 | Behm |
| 2013/0200064 A1 | 8/2013 | Alexander |
| 2013/0206015 A1 | 8/2013 | Jacoby et al. |
| 2013/0221013 A1 | 8/2013 | Kolowich et al. |
| 2013/0239607 A1 | 9/2013 | Kelly |
| 2013/0255824 A1 | 10/2013 | Williams et al. |
| 2013/0275075 A1 | 10/2013 | Johnson |
| 2013/0287967 A1 | 10/2013 | Ono |
| 2014/0165607 A1 | 6/2014 | Alexander |
| 2014/0230484 A1 | 8/2014 | Yavitz |
| 2014/0238985 A1 | 8/2014 | Sweeney et al. |
| 2015/0024349 A1 | 1/2015 | Bischoff |
| 2015/0122688 A1 | 5/2015 | Dias |
| 2015/0245723 A1 | 9/2015 | Alexander |
| 2015/0335184 A1 | 11/2015 | Balachandran |
| 2016/0045047 A1 | 2/2016 | Healy |

FOREIGN PATENT DOCUMENTS

| | | |
|---|---|---|
| CN | 1748112 A | 3/2006 |
| CN | 1776992 A | 5/2006 |
| CN | 2922666 Y | 7/2007 |
| CN | 101069606 A | 11/2007 |
| CN | 201042350 Y | 4/2008 |
| CN | 201076180 | 6/2008 |
| CN | 201308643 | 10/2008 |
| CN | 201237271 | 5/2009 |
| CN | 201303850 Y | 9/2009 |
| CN | 201445353 U | 5/2010 |
| CN | 101820128 A | 9/2010 |
| CN | 201612420 U | 10/2010 |
| CN | 102802294 | 5/2012 |
| CN | 202681700 | 1/2013 |
| CN | 202919767 U | 5/2013 |
| CN | 102266184 B | 10/2013 |
| CN | 203468187 U | 3/2014 |
| DE | 19744526 | 4/1999 |
| DE | 20108363 | 8/2001 |
| DE | 20314416 | 1/2004 |
| EP | 0332355 | 9/1989 |
| EP | 0722708 | 7/1996 |
| EP | 0895772 | 2/1999 |
| EP | 2 165 243 | 3/2010 |
| EP | 2001761 | 1/2012 |
| EP | 2308771 | 6/2012 |
| FR | 2737380 | 1/1997 |
| FR | 2752377 | 2/1998 |
| FR | 2763463 | 11/1998 |
| FR | 2828082 | 2/2003 |
| GB | 2 390 798 A | 1/2004 |
| GB | 2441825 | 3/2008 |
| JP | U-S54-147575 | 4/1953 |
| JP | 11-268777 | 10/1999 |
| JP | 2000-279302 A | 10/2000 |
| JP | 2003-299255 A | 10/2003 |
| JP | A-2004-261493 | 9/2004 |
| JP | 2006-345957 | 6/2005 |
| JP | 2006-068152 | 3/2006 |
| JP | 2006-102234 A | 4/2006 |
| JP | 2006-166522 A | 6/2006 |
| JP | 2007-064557 A | 3/2007 |
| JP | 2007-312932 | 12/2007 |
| JP | 2008-173464 A | 7/2008 |
| JP | U-3153007 | 7/2009 |
| JP | 2010-527226 A | 8/2010 |

(56) References Cited

FOREIGN PATENT DOCUMENTS

| JP | 2011-171205 | 9/2011 |
|---|---|---|
| JP | 5127819 | 1/2013 |
| JP | 5481388 | 4/2014 |
| WO | WO 2004/055654 A2 | 7/2004 |
| WO | WO 2008/028329 | 3/2008 |
| WO | WO 2008/065175 | 6/2008 |
| WO | WO 2008/137996 | 11/2008 |
| WO | WO 2008/155538 A2 | 12/2008 |
| WO | WO 2009/138930 | 11/2009 |
| WO | WO 2012/104665 | 8/2012 |

OTHER PUBLICATIONS

European Patent Office Search Report dated Mar. 17, 2016 regarding Application No. 11838764.6-1804, PCT/US2011059014, 7 pages.
First Office Action dated Nov. 23, 2016 in CN Application No. 201480014620.9.
International Preliminary Report on Patentability dated May 7, 2013 in PCT Application No. PCT/US2011/059014.
International Search Report and Written Opinion dated Jan. 12, 2016 in PCT Application No. PCT/US15/36304.
International Search Report and Written Opinion dated Dec. 9, 2014 in PCT/US2014/019130.
International Search Report and Written Opinion dated Mar. 16, 2012 in PCT/US2011/059014.
Non-final Office Action dated Nov. 14, 2016 in U.S. Appl. No. 15/050,714.
Non-final office action dated Aug. 2, 2016 in Japanese Patent Application No. 2013-537797.
Notice of Reason(s) for Rejection dated Aug. 11, 2015 in JP Application No. 2013-53797.
Office Action in related Chinese Application No. 201180063844.5, dated Dec. 29, 2014.
Patent Examination Report No. 1 in related Australian Application No. 2011323416, dated May 15, 2015.
Patent Examination Report No. 2 dated Oct. 20, 2015 in Australian Application No. 2011323416.
Second Office Action dated Apr. 10, 2017 in CN Application No. 201510869257.5.
Supplementary European Search Report dated Oct. 18, 2016 in European Patent Application No. 14774350.4.

* cited by examiner

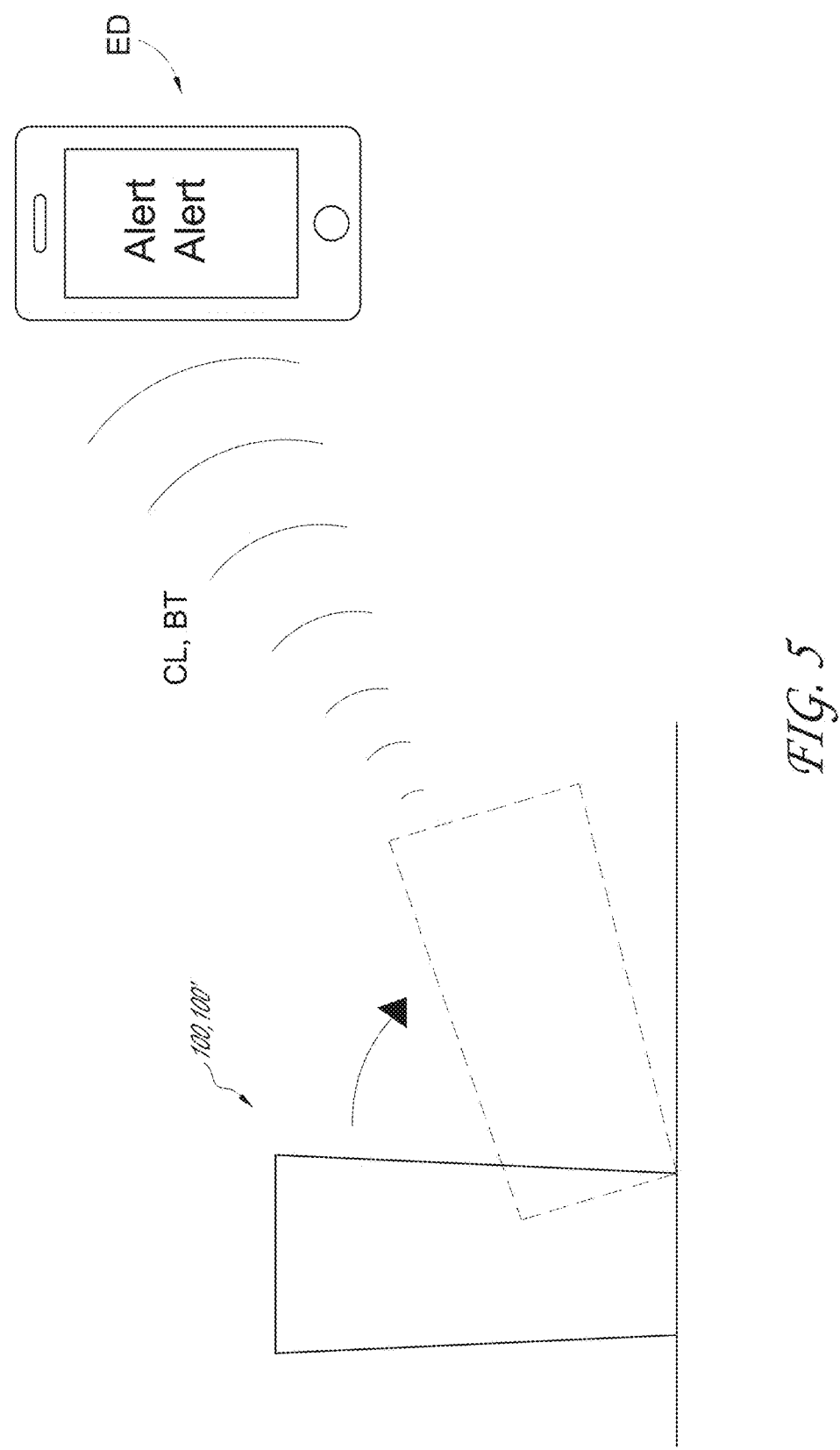

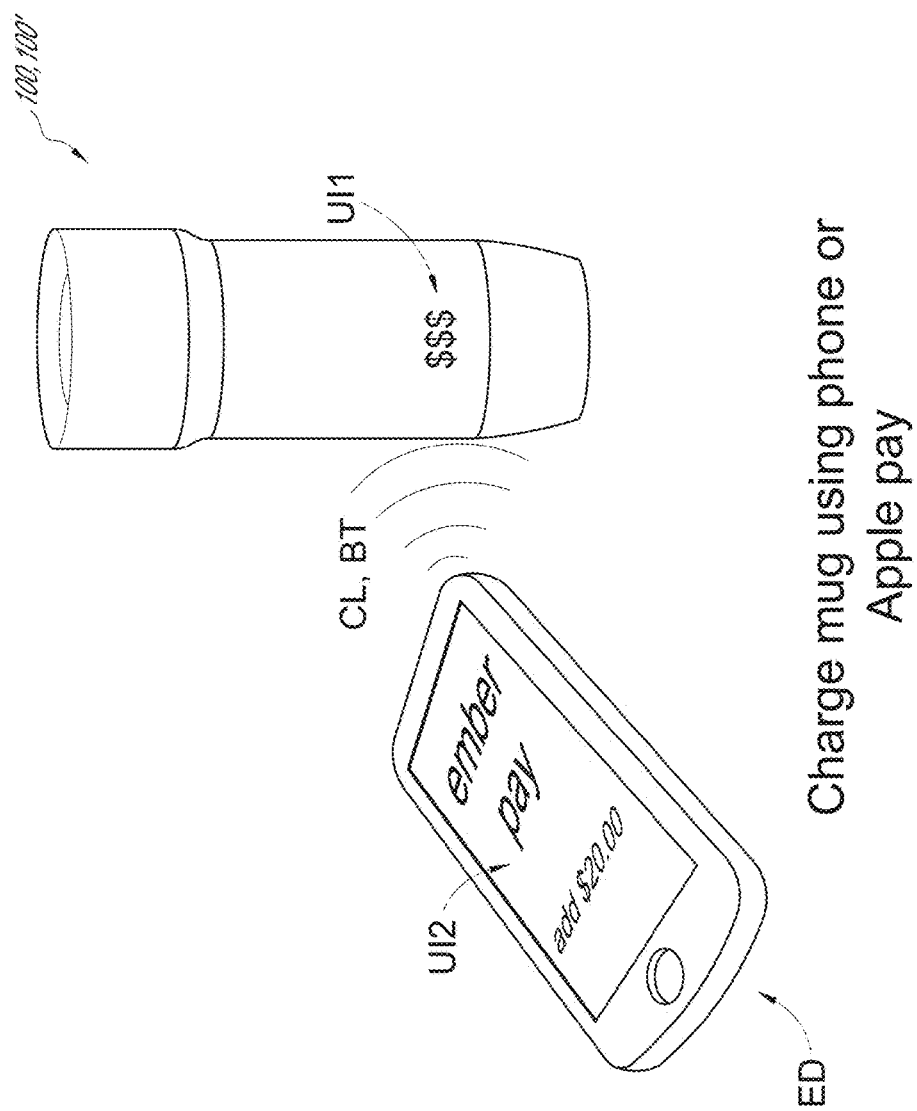

HEATED OR COOLED DRINKWARE

CROSS-REFERENCE TO RELATED APPLICATIONS

This application is related to U.S. application Ser. No. 14/712,313, filed May 14, 2015, the entire contents of all of which are hereby incorporated by reference and should be considered a part of this specification.

BACKGROUND

Field

The present invention is directed to a beverage container, and more particularly to a beverage container with active temperature control used to adjust a temperature of a liquid poured into the beverage container.

Description of the Related Art

Conventional drinkware containers (e.g., cups, mugs, travel mugs, liquid containers, baby bottles, drinking bottles) are sometimes made of ceramic, plastic or metal materials, but do not retain the temperature of a heated liquid poured into them for very long, making the drinking experience (e.g., of coffee, tea, hot chocolate, etc.) unsatisfactory. Users sometimes reheat the liquid in the container by placing it in a microwave oven, but this is inconvenient, time consuming and not always possible (e.g., when a microwave oven is not available).

SUMMARY

There is a need for drinkware (e.g., cups, mugs, travel mugs, liquid containers, baby bottles, drinking bottles) with active temperature control allowing a heated liquid poured into the container to be retained in a heated state for an extended period of time and that can be mobile/portable, allowing the user to consume a beverage at a desired temperature over an extended period of time and while mobile (e.g., driving in the car, traveling on an airplane or train).

In accordance with one aspect, a beverage container with active temperature control is provided. The container comprises a body having a chamber configured to receive and hold a liquid and a temperature control system. The temperature control system comprises a phase change material (PCM) in thermal communication with at least a portion of the chamber, the phase change material configured to transition from one phase to a second phase to remove heat from a liquid disposed in the chamber that has a temperature above a temperature of the phase change material to lower the temperature of the liquid. The temperature control system also comprises one or more heating elements in thermal communication with at least a portion of the chamber, control circuitry configured to control the operation of the one or more heating elements, one or more power storage elements configured to power one or both of the control circuitry and one or more heating elements, and one or more sensors configured to sense a parameter of the liquid or operating parameter of the temperature control system. The control circuitry is configured to turn off or turn on, or increase power to or decrease power to the one or more heating elements such that a temperature of the liquid approaches a predetermined temperature.

In accordance with another aspect, a beverage container with active temperature control is provided. The container comprises a body having a chamber configured to receive and hold a liquid and a temperature control system. The temperature control system comprises means for passively cooling at least a portion of the chamber to cool a liquid disposed in the chamber, one or more heating elements in thermal communication with at least a portion of the chamber, control circuitry configured to control the operation of the one or more heating elements, one or more power storage elements configured to provide electrical energy to one or both of the control circuitry and one or more heating elements, and one or more sensors configured to sense a quality of the liquid or operating parameter of the temperature control system. Said means removes heat from a liquid disposed in the chamber that has a temperature above a predetermined temperature to lower the temperature of the liquid toward the predetermined temperature. The control circuitry is configured to turn off or turn on, or increase power to or decrease power to the one or more heating elements to maintain the temperature of the liquid at approximately said predetermined temperature or increase the temperature of the liquid above said predetermined temperature.

BRIEF DESCRIPTION OF THE DRAWINGS

FIG. 5 is a schematic showing a tip alert function of the drinkware container.

FIG. 6 is a schematic showing communication between a remote electronic device and a drinkware container.

DETAILED DESCRIPTION

Figure 1:
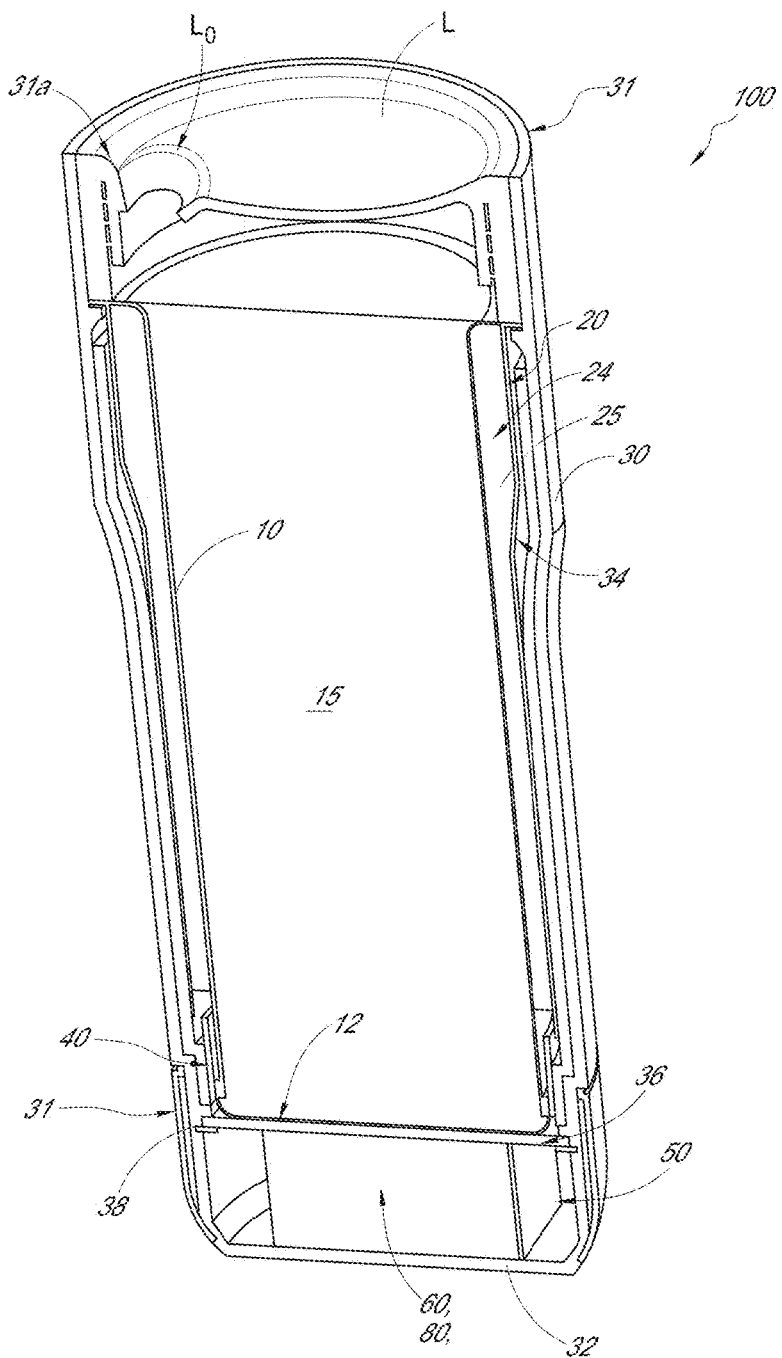
FIG. 1 is a schematic cross-sectional view of an embodiment of a drinkware container.

FIG. 1 shows a lengthwise cross-sectional view of an embodiment of a drinkware container 100 (hereinafter "container 100"). As only a cross-section is shown, the other half of the drinkware container 100 is excluded in FIG. 1 to illustrate the various components of the container 100. One of skill in the art will understand that the excluded portion of the drinkware container 100 in FIG. 1 is a mirror image of the portion of the drinkware container 100 that is shown in FIG. 1. In the illustrated embodiment, the container 100 is shown as a mug (e.g., travel mug). However, the drinkware container 100 can be other types of containers, such as a cup, mug, beer mug, baby bottle, carafe, thermos or other handheld portable liquid containers.

The container 100 has an inner sidewall 10 (e.g., a circumferential or cylindrical inner sidewall) and inner bottom wall or base 12, which together define a chamber 15 that receives and holds a liquid therein. The container 100 also has a second sidewall 20 (e.g., a circumferential or cylindrical inner sidewall) that is spaced apart (e.g., radially spaced apart) from the inner sidewall 10 so as to define a chamber (e.g., an annular chamber) 24 between the inner wall 10 and the second wall 20. Optionally, the inner sidewall 10 can be made of metal (e.g., stainless steel). However, in other embodiments, the inner sidewall 10 can be made of other suitable materials (e.g., a plastic material). Optionally, the second sidewall 20 can be made of the same material as the inner sidewall 10 (e.g., both the inner sidewall 10 and the second sidewall 20 can be made of metal, such as stainless steel). In another embodiment, the second sidewall 20 can be made of a different material than the inner sidewall 10; for example, the inner sidewall 10 can be made of metal, such as stainless steel, and the second sidewall 20 can be made of a plastic material that insulates the outer portion of the container 100 from the inner sidewall 10 and the liquid contents of the chamber 15. Optionally, the inner sidewall 10 and the second sidewall 20 are part of a single piece (e.g., monolithic piece), so that the inner and second sidewall 10, 20 are fixed (e.g., not removable) relative to each other.

The chamber 24 can be filled with a phase change material (PCM) 25. The PCM 25 can be a solid-solid phase change material, or a solid-liquid phase change material. The PCM 25 can be a wax (e.g., Paraffin wax). However, other suitable phase change materials (e.g., a metal phase change material) can be used.

The PCM 25 can be selected to have a predetermined transition (e.g., melting) temperature that generally corresponds to a suitable drinking temperature for a heated liquid. In some embodiments, the predetermined transition temperature can optionally be between 135 degrees F. and 145 degrees F., such as optionally be 140 degrees F. In one embodiment, when the liquid (e.g., hot coffee, hot tea, soup) poured into the chamber 15 of the container 100 has a temperature above the predetermined transition temperature, the PCM 25 can absorb heat from the liquid to cause the PCM 25 to transition, for example, from a solid to a liquid, thereby decreasing the temperature of the liquid toward the said predetermined temperature. As the temperature of the liquid drops (e.g., via conduction of heat from the liquid through the inner sidewall 10 to the PCM 25), the operation of the container 100 approaches a steady state of operation where the temperature of the liquid approaches the predetermined transition temperature (e.g., equilibrium temperature), where it can remain for an extended period of time (e.g., for at least 1 hour, for at least 2 hours, for at least 3 hours, etc.).

The container 100 can have an outer sidewall 30 (e.g., a circumferential or cylindrical inner sidewall) that extends from a rim 31 of the container 100 to an outer bottom wall 32. The rim 31 can optionally partially define a drinking lip 31a of the container 100, e.g., along with an opening Lo in a lid L that can removably cover the proximal end of the container 100. Optionally, the outer sidewall 30 and outer bottom wall 32 can be a single piece (e.g., monolithic with no seams). However, in other embodiments, at least a portion of the outer sidewall 30 can be separate from the bottom wall 32, as discussed further below. The outer sidewall 30 can be disposed radially outward from the second sidewall 20. Optionally, the outer sidewall 30 can be radially spaced apart from the second sidewall 20 to define a chamber 34 (e.g., an annular chamber) therebetween. In one embodiment, the chamber 34 can provide an air gap between the second sidewall 20 and outer sidewall 30, where said air gap can insulate the outer sidewall 30 from the second sidewall 20 and the inner sidewall 10. In other embodiments, the chamber 34 can be filled with an insulative material (e.g., foam). In still another embodiment, the chamber 34 can optionally be under vacuum. However, in other embodiments, the outer sidewall 30 can be adjacent the second sidewall 20 so that there is no gap therebetween. Optionally, the outer sidewall 30 can be made of an insulative material (e.g., foam, plastic).

With continued reference to FIG. 1, the container 100 can optionally have one or more heat transfer elements 40 (such as one or more heating elements) disposed about (e.g., circumferentially about) at least a portion of the inner wall 10 so that it is in thermal communication (e.g., direct thermal communication) with the inner wall 10 to heat liquid in the chamber 15. In the illustrated embodiment, the one or more heating elements 40 are disposed about at least a portion of the inner wall 10 at a location below the chamber 24. The one or more heating elements 40 are optionally one or more resistive heaters. In one embodiment, the one or more heating elements 40 can optionally be defined by a trace pattern screen printed onto the (inner or outer) surface of the inner wall 10. A connecting lead line can electrically connect the one or more heating elements 40 to one or more power storage elements 60 disposed in a bottom chamber 50 and/or control circuitry 80 disposed in the bottom chamber 50. For example, in one embodiment such a lead line can extend from the one or more heating elements 40 downward along the outer surface of the inner bottom wall 12 to the one or more power storage elements 60 and/or control circuitry 80. In one embodiment, the one or more heating elements 40 can optionally be a thermoelectric element (e.g., Peltier element) operable to heat or cool the liquid in the chamber 15. Though the discussion in this paragraph of heat transfer elements refers to one or more heating elements 40, one of skill in the art will recognize that heat transfer elements can also apply to one or more cooling elements or one or more heating and cooling elements (e.g., thermoelectric elements, such as Peltier elements), and that this disclosure is meant to apply to all these options for heat transfer elements of the container 100.

In the illustrated embodiment, the outer sidewall 30 and outer bottom wall 32 are optionally a single piece (e.g. monolithic with no seams), such that the one or more power storage elements 60 (e.g., batteries, capacitors) and control circuitry 80 are permanently housed in the chamber 50. In another embodiment, the outer bottom wall 32 is removable relative to the outer sidewall 30 to allow access to the chamber 50 (e.g., to replace the power storage elements 60, perform maintenance on the electronics, etc.). In another embodiment, at least a portion of the outer sidewall 30 can be separate from the outer bottom wall 32 (and/or at least another portion of the outer sidewall 30) so that the one or more power storage elements 60 and control circuitry 80 are housed in a module that can be removably coupled to the rest of the container 100. For example, said module can be coupled to a bottom plate 36 via a threaded connection, key-slot connection, magnetic connection, or other suitable connection. In such an embodiment, the lead line from the heating element 40 can terminate at the bottom plate 36 and establishes an electrical connection with a separate lead line in said module when the module is coupled to the container 100. In still another embodiment, the outer bottom wall 32 can be removably attached to the container 100 and can be removed to access the control circuitry 80 and/or one or more power storage elements 60 for maintenance, testing and/or replacement. In some embodiments, the bottom wall 32 can optionally have one or more electrical contacts on an outer surface thereof that contacts a corresponding electrical contact on a charging base, through which the one or more power storage elements 60 can be charged when the container 100 is disposed on the charging base. Said one or more electrical contacts on the bottom wall 32 can optionally be circular. In another embodiment, the electrical contacts can be excluded, and the one or more power storage elements 60 can be charged via inductive power (e.g., via a charging base with an inductive power transmitter that transmits power to an inductive power receiver in the container 100.

The control circuitry 80 can optionally control the charging of the one or more power storage elements 60 (e.g., the control circuitry 80 can include a charging circuit), and can control delivery of power to the heating element 40. In one embodiment, the control circuitry 80 can control delivery of power to the heating element 40 to maintain the liquid in the chamber 15 at the predetermined temperature (e.g., a preset factory temperature set point, a previously selected or preselected temperature set point stored in a memory of the control circuitry 80). In another embodiment, the control circuitry 80 can control delivery of power to the heating element 40 to input heat to the liquid to increase the temperature of the liquid to a user selected temperature. Said user selected temperature can optionally be provided via a user interface (such as user interface UI1 in FIG. 10) on the body of the container 100. In another embodiment, the user selected temperature can be provided wirelessly to the control circuitry 80 (which can have a receiver or transceiver) from a portable electronic device (e.g., electronic device ED in FIG. 10, such as a smart phone or tablet computer), for example so that there are no buttons or other controls on the container 100 that the user manually actuates. Optionally, the control circuitry 80 can control delivery of power to the heating element 40 based at least in part on information from one or more sensors (e.g., sensors S1-Sn in FIG. 10, sensors 16 in FIG. 1A) that sense one or more parameters of the liquid (e.g., temperature, liquid volume or level, acidity, pH) where said one or more sensors can be on a surface of the container 100, such as on one or both of the inner sidewall 10 and inner bottom wall 12. Said sensors can be any of the sensors disclosed herein and can communicate with the control circuitry 80 in any manner disclosed herein. Further details on sensors can be found in U.S. application Ser. No. 14/712,813, filed May 14, 2015, which is hereby incorporated in its entirety and should be considered a part of this specification.

During operation, a user can pour a hot liquid into the chamber 15. If the temperature of the liquid is above the transition temperature of the PCM 25, heat can be transferred from the liquid to the PCM 25 to drop the temperature of the liquid in the chamber 15 toward an equilibrium temperature (e.g., the temperature of the liquid can drop until an equilibrium temperature is achieved between the temperature of the PCM and the temperature of the liquid in the chamber 15). The control circuitry 80 can operate (e.g., based on the information provided by the sensors) to supply power to the one or more heating elements 40 to either maintain the temperature of the liquid in the chamber 15 relatively steady (or within a desired temperature range) for an extended period of time, or to increase the temperature of the liquid in the chamber 15 (e.g., to actively control the temperature of the liquid in the chamber 15). The active temperature control of the container 100 can advantageously operate during at least a period of time (e.g., a portion of the period of time) during which the container 100 is used. Accordingly, the term "active", as used herein, is not limited to continuous operation of the one or more heating elements 40. As used herein, heat transfer encompasses a heating, as well as a cooling, process. Therefore, a "heat transfer element" as used herein is an element that can effect a heating or a cooling process.

In one embodiment, the outer sidewall 30 of the container 100 can include an electronic ink outer shell to display custom logos or skins to personalize the container 100. In one embodiment, the electronic ink shells can be electrically connected to one or more of the control circuitry 80 and one or more power storage elements 60 and wireless communication module (which may be part of the control circuitry). The user can change the skin or logo on the electronic ink shells via the remote (e.g., mobile) electronic device (e.g., the electronic device ED in FIG. 10, which can be wirelessly paired with the container 100 via the wireless communication module). In one embodiment, the user can purchase skins via an app through their remote electronic device, and select the desired skin for display on the electronic ink shell of the container 100.

With continued reference to FIG. 1, the outer sidewall 30 of the container 100 can include a lower portion 38 with a smaller diameter than an upper portion of the outer sidewall 30 so as to define a stepped portion in a lower portion of the container 100. The container 100 can optionally also include a movable sidewall 31 disposed about the lower portion 38. In the illustrated embodiment, the movable sidewall 31 can rotate relative to the lower portion 38 (e.g., about the axis of the container 100), e.g. via a bearing. In one embodiment, the movable sidewall 31 can have substantially the same diameter as the outer sidewall 30 at a location above the lower portion 38, so that the movable sidewall 31 is substantially aligned with the outer sidewall 30 at said location above the lower portion 38. In one embodiment, the movable sidewall 31 can be in operative communication with one or more sensors that can sense the rotation of the movable sidewall 31 with respect to at least a portion of the outer sidewall 30 (e.g., with respect to at least a portion of the lower portion 38). In one embodiment, at least one of said one or more sensors can be an optical sensor. In another embodiment, at least one of said one or more sensors can be a Hall effect sensor. However, other suitable sensors for sensing the movement of the movable sidewall 31 can be used (e.g., capacitance sensor).

Said one or more sensors can communicate the sensed rotation of the movable sidewall 31 to the control circuitry 80, which can control the operation of the one or more heating elements 40 based at least in part on said sensed rotation. In one embodiment, the control circuitry 80 can, via an algorithm stored in a memory of the control circuitry 80, associate an incremental rotation of the movable sidewall 31 with an incremental change in a user selected temperature (as discussed above), and can operate the one or more heating elements 40 so that the liquid in the chamber 15 approaches said user selected temperature. Accordingly, in one embodiment, the movable sidewall 31 can be used to change a temperature set point for the container 100 to which the liquid in the chamber 15 is to be heated (or cooled, such as where the one or more heating elements 40 includes a thermoelectric element).

With continued reference to FIG. 1, in one embodiment the container 100 can optionally have one or more capacitance touch sensors (which can be one of the sensors S1-Sn in FIG. 10, sensors 16 in FIG. 1A) on the outer sidewall 30, which the user can actuate to control the operation of the container 100. Said capacitance touch sensors can be similar to the soft touch sensors discussed above. The capacitance touch sensors can communicate with the control circuitry 80 (e.g., via a lead line that extends between the one or more sensors and the control circuitry 80). For example, the user can touch the capacitance touch sensor to unlock or wake up the control circuitry 80, allowing an adjustment in the user selected temperature (as discussed above) by rotating the movable sidewall 31. After a period of time (which can be a set period of time saved in a memory of the control circuitry 80), the control circuitry 80 can lock out the control of the container 100 such that further rotation of the movable sidewall 31 will not adjust the user selected temperature. If the user wishes to again adjust the user selected temperature, they can again contact the capacitance touch sensor to again unlock the control of the container 100, and thereby adjust the user selected temperature via the rotation of the movable sidewall 31. In one embodiment, a user can double tap the capacitance touch sensor, which can result in the name the user has assigned to the container 100 being shown on the user interface (e.g., user interface UI1 in FIG. 10) of the container 100. In another embodiment, the double tapping of the capacitance touch sensor can result in the user interfaces (e.g., user interface UI1) of the container 100 toggling between different information (e.g., between showing the user selected temperature in degrees Fahrenheit and degrees Celsius).

In one embodiment, the one or more capacitance touch sensors can be used to turn one and off the electronics of the container 100. For example, in embodiments where there is only one capacitance touch sensor, the user can press the sensor for an X amount of time (e.g., 2 seconds, 3 seconds, 5 seconds) to turn the electronics (e.g., control circuitry 80) on if it was previously off, or to turn the electronics off if they were previously on.

In one embodiment, the container 100 can optionally include a visual indication screen (e.g., user interface UI1 in FIG. 10) on the outer sidewall 30, which can communicate with the control circuitry 80 and can display information associated with the operation of the container 100. For example, the visual indication screen can indicate when the control circuitry is in operation (e.g., "ON"). In another example, the visual indication screen can indicate the user selected temperature, e.g., as the user rotates the movable sidewall 31 to adjust the user selected temperature, as discussed above. In still another embodiment, the visual indication screen can display information (e.g., the user's name) communicated to the control circuitry 80 from a mobile electronic device (e.g., via Bluetooth or other wireless communication method) of via the internet from a remote computer, or display other operational information (e.g., liquid level in container 100, such as "HALF FULL", "QUARTER FULL", battery charge level or operating time left before battery needs charging).

Figure 1A:
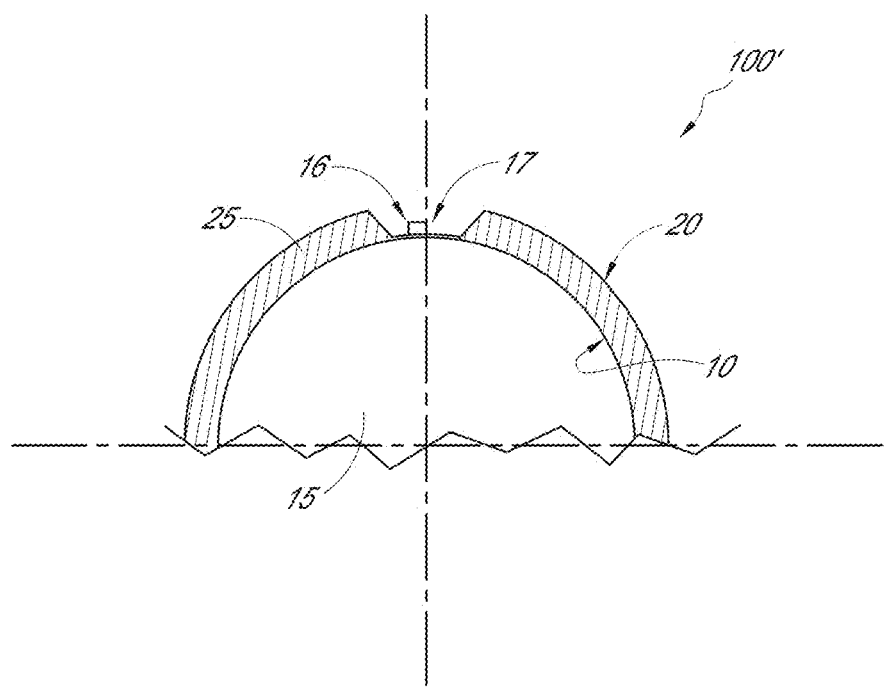
FIG. 1A is a schematic partial transverse cross-sectional view of an embodiment of a drinkware container.

As shown in FIG. 1A, in one embodiment, the container 100' can include one or more sensors 16 that can sense information about the container 100, 100', such as information indicative of a parameter of the liquid (e.g., liquid level, temperature) in the chamber 15. Such sensors can be any of the types of sensors disclosed herein (e.g., capacitance sensors, ultrasound sensors, temperature sensors). In one embodiment, the one or more sensors 16 can be a plurality of sensors 16 that are in contact with the inner sidewall 10 along a length (e.g., the entire length, ¾ of the length, etc.) of the inner sidewall 10 and communicate the sensed parameter information to the control circuitry 80 (e.g., via one or more lead lines between the sensors 16 and the control circuitry 80). For example, the plurality of sensors 16 can be mounted to a flex strip attached to (e.g., adhered, such as with a thermally conductive adhesive, to) the inner sidewall 10. In one embodiment, as shown in FIG. 1A, the plurality of sensors 16 are on the outer surface of the inner sidewall 10 so as not to be within the chamber 15. In the illustrated embodiment, the strip of sensors 16 are positioned against the outer surface of the inner sidewall 10 at a recessed location 17 where the second sidewall 20 and PCM 25 are not present; as shown in FIG. 1A, the second sidewall 20 contacts the inner sidewall 10 on either side of said recess 17 in which the strip of sensors 16 is placed. In one embodiment, the plurality of sensors 16 can be temperature sensors, such as Negative Temperature Coefficient (NTC) thermistors.

In one embodiment, the control circuitry 80 can determine (e.g., based on one or more algorithms stored in a memory thereof) the liquid level in the chamber 15 based at least in part on the sensed parameter information (e.g., sensed temperature or information indicative of temperature) communicated from the plurality of sensors 16. In one embodiment, the control circuitry 80 can, based on the information sensed by the plurality of sensors 16, determine the differential in temperature between any two adjacent sensors 16. Where such differential exceeds a certain amount (e.g., 5 degrees F., 10 degrees F., 15 degrees F.) and/or indicates a temperature higher than ambient by a certain amount, the control circuitry 80 can determine that the liquid level in the chamber 15 is between said two sensors 16 of the plurality of sensors 16 that exhibit this temperature differential, and can indicate the location of liquid level (e.g., based on the arrangement of the plurality of sensors 16 vertically along the inner sidewall 10), such as by communicating information associated with the determined liquid level (e.g., to a visual indication screen on the container 100, to a mobile electronic device associated or paired with the container 100, etc.). Said information associated with the determined liquid level that is communicated to the user can be in the form of a quantitative value provided to the user (e.g., level at 6/10, 5/10, 1/10) or qualitative level (e.g., "half full", "quarter full", etc.). In another embodiment, said information associated with the determined liquid level can be communicated via a visual graphic to the user (e.g., a chamber shown half full, a quarter full, etc.) without any text or numerical indication of the level.

In one embodiment, the plurality of sensors 16 are not calibrated and the control circuitry 80 uses the relative change in sensed temperature (or relative change in sensed information, such as capacitance, indicative of temperature) from the plurality of sensors 16 to determine the liquid level in the chamber 15. In another embodiment, the plurality of sensors 16 can be calibrated when the chamber 15 has been filled entirely and the temperature of the liquid in the chamber 15 has stabilized to increase the accuracy of the sensors 16. For example, such sensors 16 with increased accuracy can be used to indicate not only the liquid level in the chamber 15, but also the level of another substance (e.g., foam, such as where the beverage is a Cappucino espresso drink) on top of the liquid in the chamber 15.

In one embodiment the sensed liquid level, such as the level determined based on information from the plurality of sensors 16, can be combined with a sensed tilting of the container 100 (e.g., via a gyroscope in the container 100 that communicates with the control circuitry 80). Therefore, when the tilt sensor senses that the container 100 has been titled by more than a predetermined amount from vertical (e.g., more than 25 degrees from vertical, etc.), the control circuitry 80 can turn off power to the one or more heating (or cooling) elements 40, and can cease control based on information provided from the sensors, until the sensed orientation of the container 100 is less than the predetermined amount (e.g., less than 25 degrees from vertical, etc.).

Though the features disclosed above may be described in connection with the container 100, one of skill in the art will recognize that any of the features described in this embodiment can also apply to any drinkware, dishware, serverware, and storage container (e.g., cup, travel mug, baby bottle, sippy cup, thermos, water bottle, such as a reusable water bottle, carafe, soup container, bowl, plate, platter, food storage containers, such as Tupperware® containers, lunch boxes) and the scope of disclosure and the invention is understood to cover such liquid containers, drinkware, dishware and serverware.

Figure 2:
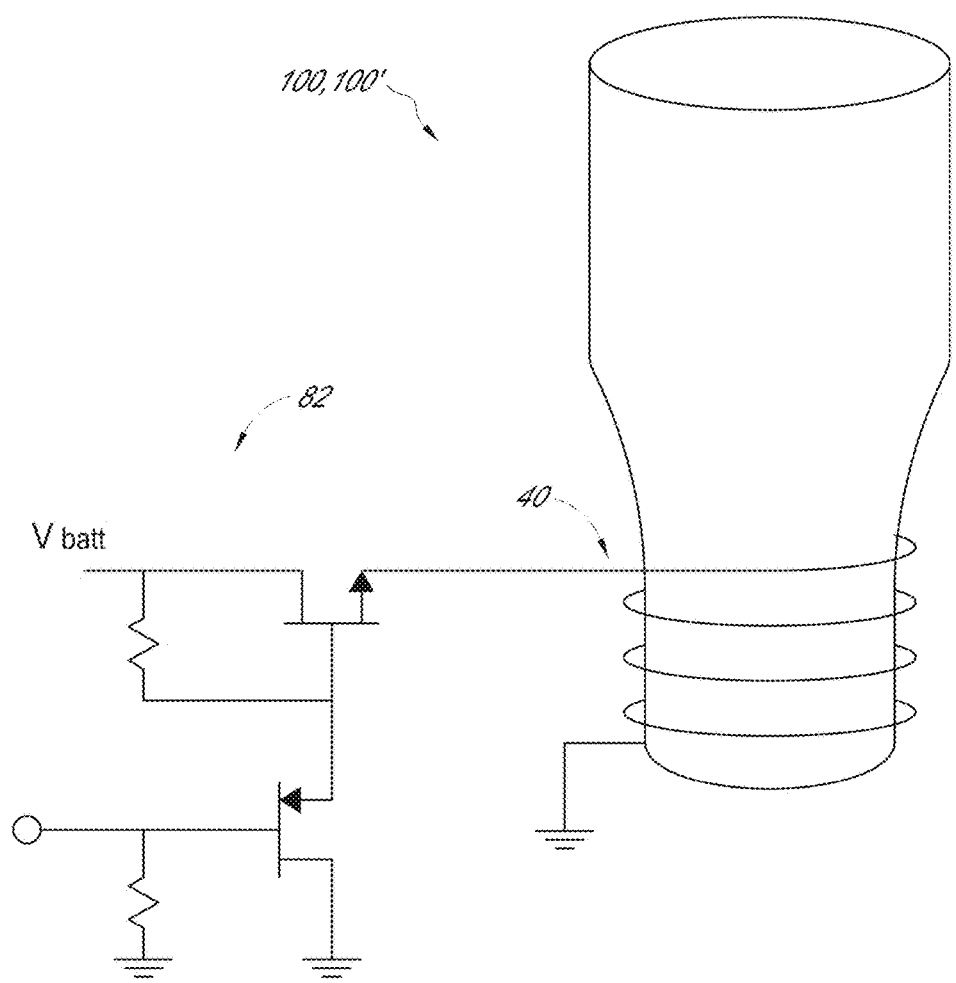
FIG. 2 is a schematic view of a control circuit for the drinkware container.

FIG. 2 shows a schematic view of one embodiment of a circuit 82 of a control circuitry for a drinkware container, such as the container 100, 100', that can contribute to the control of the one or more heat transfer elements 40, such as a heating element 40, of the drinkware container 100, 100'. Said circuit 82 can be part of the control circuitry 80 of the drinkware container 100, 100'. In the illustrated embodiment, the heating element 40 is a heater coil.

Figure 3:
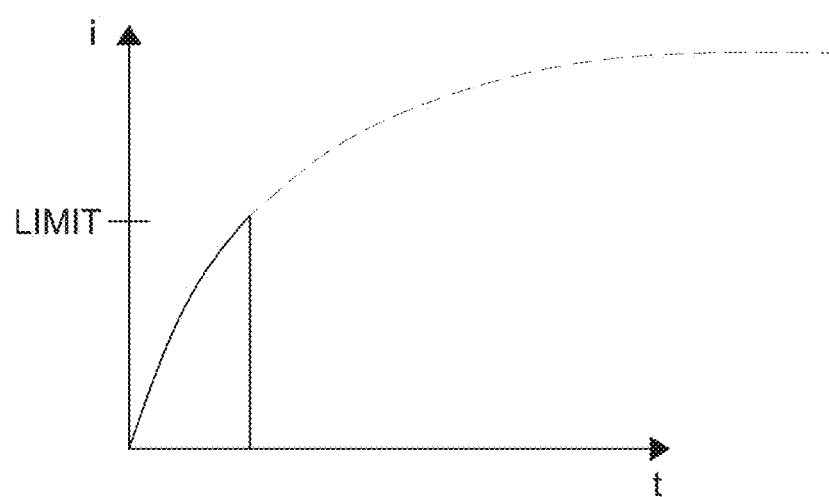
FIG. 3 is a graph of inductor current versus time of a heat transfer element of the drinkware container.

The circuit 82 can include a switch that switches power to the heater coil 40 on and off rapidly. Advantageously the natural inductance of the heater coil 40 limits the current applied to the heater coil 40, which therefore inhibits a large current load on the one or more power storage elements 60, advantageously reducing wear of the one or more power storage elements 60 since wear is highly dependent on the load placed on the power storage elements 60. FIG. 3 shows a schematic graph of inductor current versus time for the heater coil 40 of the drinkware container 100, 100'. Additionally, the switching of the power on and off to the heater coil 40 advantageously inhibits the increase of the temperature of the heater coil wire 40 beyond a point where heater efficiency is degraded (e.g., heater coil wire temperatures above about 90 degrees C.), allowing the heating element 40 to operate more efficiently. This is of particular benefit when the drinkware container 100, 100' only has one heating element (e.g., one heater coil) 40. Further, switching power to the heater coil 40 on and off allows for the one or more power storage elements 60 to operate over a longer working time, due to the reduction in wear placed on the one or more power storage elements 60.

In one embodiment, the control circuitry 80 can operate the one or more heat transfer elements 40 (e.g., one or more heating elements 40) based at least in part on a temperature difference between a selected temperature (e.g., user selected temperature or set temperature) and a temperature of the liquid in the drinkware container 100, 100' prior to application of heat to the liquid (e.g., the predetermined or equilibrium temperature provided by the PCM 25 to liquid poured into the container 100, 100'). For example, where the predetermined temperature (e.g., transition or equilibrium temperature) provided by the PCM 25 of the drinkware container 100, 100' to liquid poured into the container 100, 100' is lower than the user selected temperature (e.g., set temperature) by more than a certain amount, the control circuitry 80 can operate the one or more heat transfer elements 40 (e.g. heating elements 40) to deliver heat to the liquid before the sensed liquid temperature in the container 100, 100' drops below the set temperature (e.g., user selected temperature set point) on the way to the predetermined temperature provided by the PCM 25, which advantageously allows the liquid to reach the user selected temperature more rapidly and therefore provides more accurate temperature control for the container 100, 100'. Additionally, by operating the one or more heat transfer elements 40 before the sensed liquid temperature reaches the predetermined temperature provided by the PCM 25, the load on the one or more power storage elements 60 can advantageously be reduced by spreading the battery drain over a longer period of time rather than subjecting the one or more powers storage elements 60 to a large load.

Figure 4:
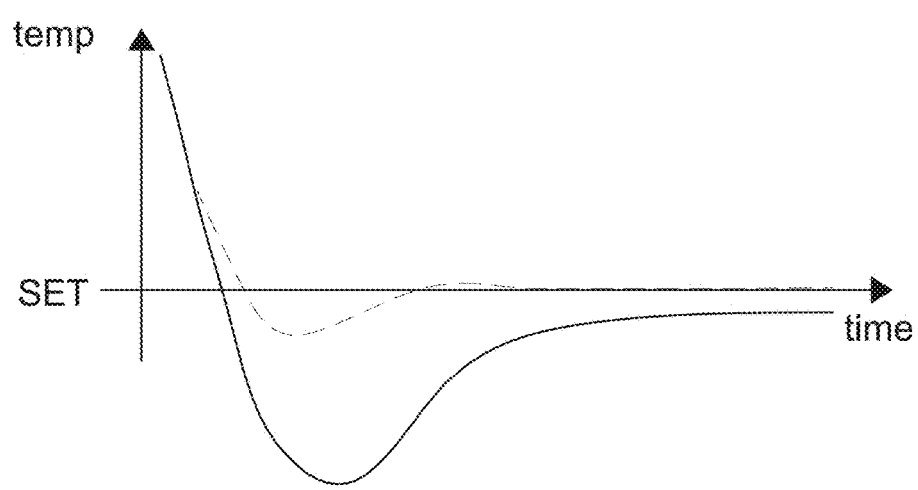
FIG. 4 is a graph of sensed temperature versus time of liquid in the drinkware container illustrating temperature control of the drinkware container.
Figure 4A:
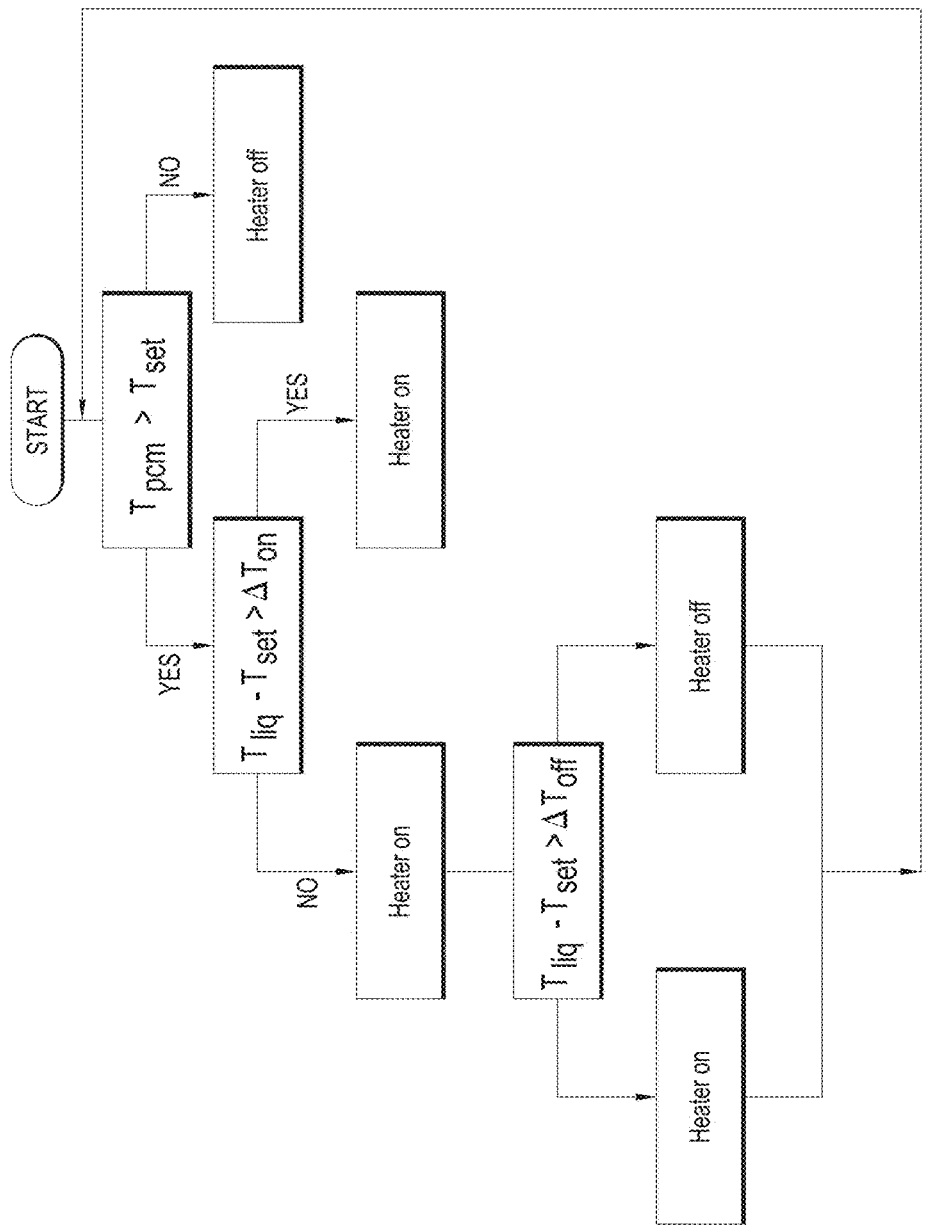
FIG. 4A shows one embodiment of a control algorithm for the drinkware container.

FIG. 4 shows a graph of sensed liquid temperature in the drinkware container 100, 100' versus time, illustrating the control concept described above. The graph illustrates the set temperature (e.g., user selected temperature). The solid line indicates a control operation where heat is not applied to the liquid by the one or more heat transfer elements 40 (e.g., one or more heating elements 40) until the sensed liquid temperature has dropped below the set temperature (e.g., below the user selected temperature set point on the way to the predetermined transition or equilibrium temperature provided by the PCM 25). The dashed line indicates a control operation (described in the previous paragraph) where the control circuitry 80 initiates operation of the one or more heat transfer elements 40 (e.g., one or more heating element 40) to heat the liquid in the container 100, 100' before the sensed liquid temperature in the container 100, 100' reaches the set temperature (e.g., user selected temperature set point). As shown in FIG. 4, the earlier operation of the one or more heating elements 40 by the control circuitry 80 (as shown by the dashed line) allows the liquid temperature in the container 100, 100' to reach the set temperature sooner with less temperature undershoot as compared to operating the one or more heating elements 40 to add heat to the liquid only after the sensed temperature has dropped below the set temperature (e.g., when the sensed liquid temperature has reached the predetermined or equilibrium temperature provided by the PCM 25). FIG. 4A shows one embodiment of a control algorithm used by the control circuitry 80 to operate the one or more heat transfer elements 40 (e.g., one or more heating elements 40) to achieve the performance shown in the dashed line in the graph of FIG. 4.

As discussed above, the drinkware container 100, 100' can have one or more sensors 16 that can sense information about the container 100, 100'. In one embodiment, at least one of the one or more sensors 16 can be an accelerometer that can sense movement of the drinkware container 100, 100'. In another embodiment, at least one of the one or more sensors 16 can be a gyroscope or tilt sensor that can sense the orientation of the container 100, 100'. In one embodiment, illustrated in FIG. 5, the one or more sensors 16 (e.g., accelerometer, gyroscope, and/or tilt sensor) can detect when the container 100, 100' has accidentally tipped over (e.g., in the car, on the table or desk), such as when a sensed acceleration is greater than a preset amount. Upon receipt of said sensed acceleration signal exceeding the preset amount, the control circuitry 80 can optionally wirelessly communicate (e.g., via the cloud CL, via a short range or near field wireless communication technology BT, such as Bluetooth) an alert signal to the remote electronic device ED indicating that the drinkware container 100, 100' has tipped over.

FIG. 6 shows communication between the remote (e.g., mobile) electronic device ED and the container 100, 100' (e.g., via the cloud CL, via a short range or near field wireless communication technology BT, such as Bluetooth).

Figure 7:
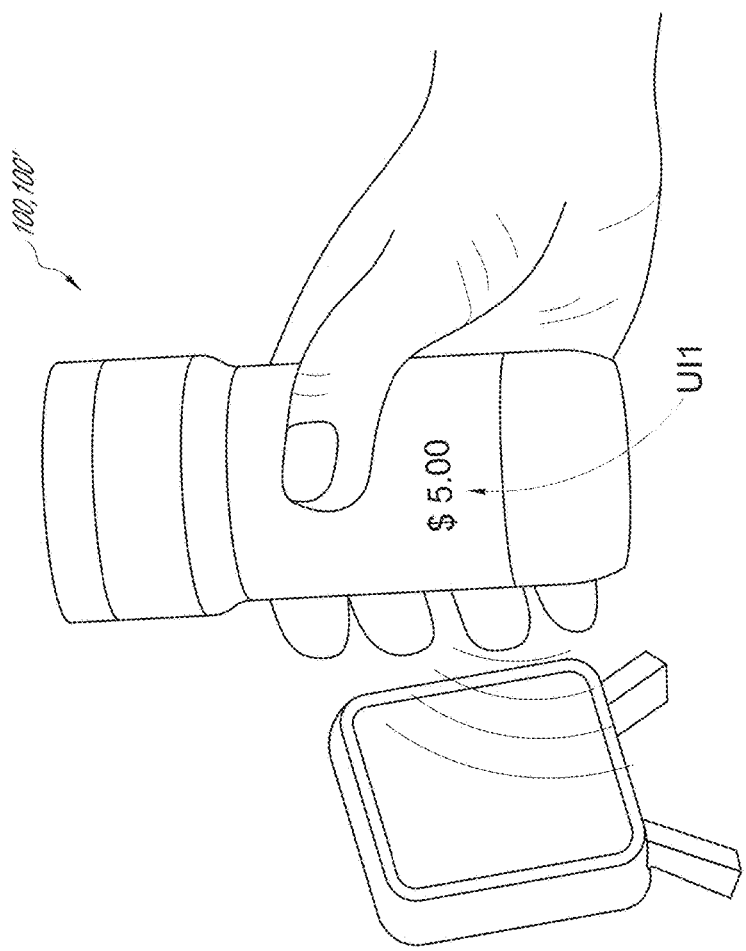
FIG. 7 is a schematic showing use of the drinkware container to make a purchase at a point of sale using an electronic payment system.

In the illustrated embodiment, a mobile payment and/or digital wallet (e.g., Apple Pay, Google Wallet) on the electronic device ED can transfer money to the container 100, 100' (e.g., to a memory in the container 100, 100', such as in the control circuitry 80), allowing the user to make digital payments (e.g., at a café or convenience store) with the container 100, 100' itself (see FIG. 7) without needing to utilize the electronic device ED to make the purchase. In another embodiment, the electronic device ED can extend the mobile payment or digital wallet function to the container 100, 100' (e.g., via near field wireless communication BT such as Bluetooth). In one embodiment, a user interface UI1 on the container 100, 100' and/or user interface UI2 on the electronic device can show the amount of currency the container 100, 100' is charged with, and this amount can be updated once a purchase has been made with the container 100, 100').

Figure 8:
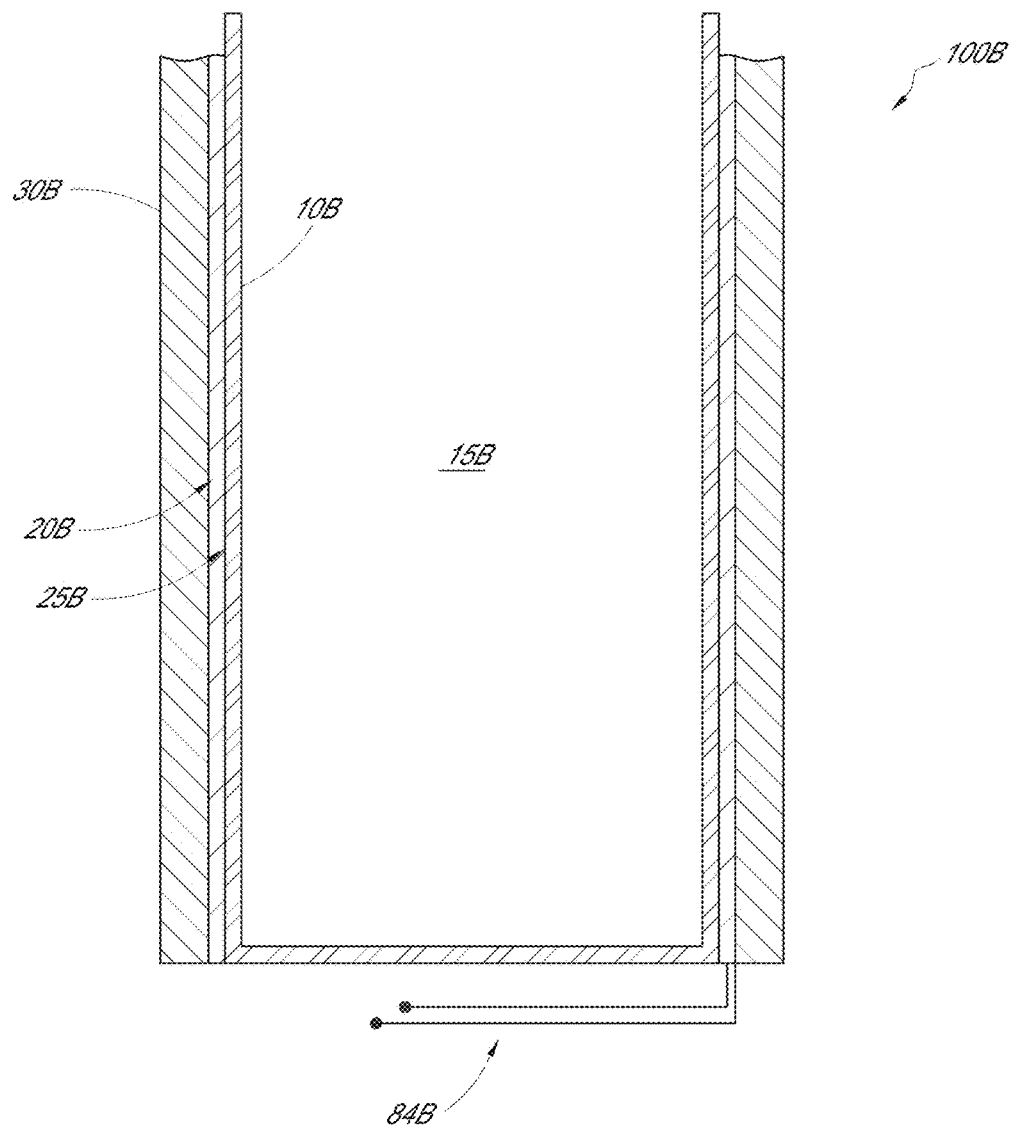
FIG. 8 is a schematic view of one embodiment of a structure of a drinkware container.

FIG. 8 shows one embodiment of a portion of a drinkware container 100B. Some of the features of the drinkware container 100B are similar to features of the drinkware container 100, 100' described above. Accordingly, references numerals used to designate the various features of the drinkware container 100B are identical to those used for identifying the corresponding features of the drinkware container 100, 100', except that a "B" has been added to the reference numeral. Therefore, the structure and description for the various features for the drinkware container 100, 100' is understood to apply to the corresponding features of the drinkware container 100B in FIG.8, except as described below.

The drinkware container 100B can have an inner sidewall 10B, a second sidewall 20B spaced from the inner sidewall 10B, and an outer sidewall 30B, with a phase change material (PCM) 25B disposed between the inner sidewall 10B and second side wall 20B. One or more electrical lines 84B can extend from the control circuitry, such as the control circuitry 80B, or one or more power storage elements, such as the power storage elements 60B, into the chamber between the inner and second side walls 10B, 20B. In one embodiment a voltage or current can be applied to the PCM 25B via the one or more electrical lines 84B to change the coefficient of thermal conductivity of the PCM 25B, thereby advantageously changing the cooling performance provided by the PCM 25B to a liquid poured into the chamber 15B. In this manner, the cooling characteristics (e.g., the amount of heat the PCM 25B is able to draw from the liquid in the chamber 15B) can be adjusted.

Figure 9:
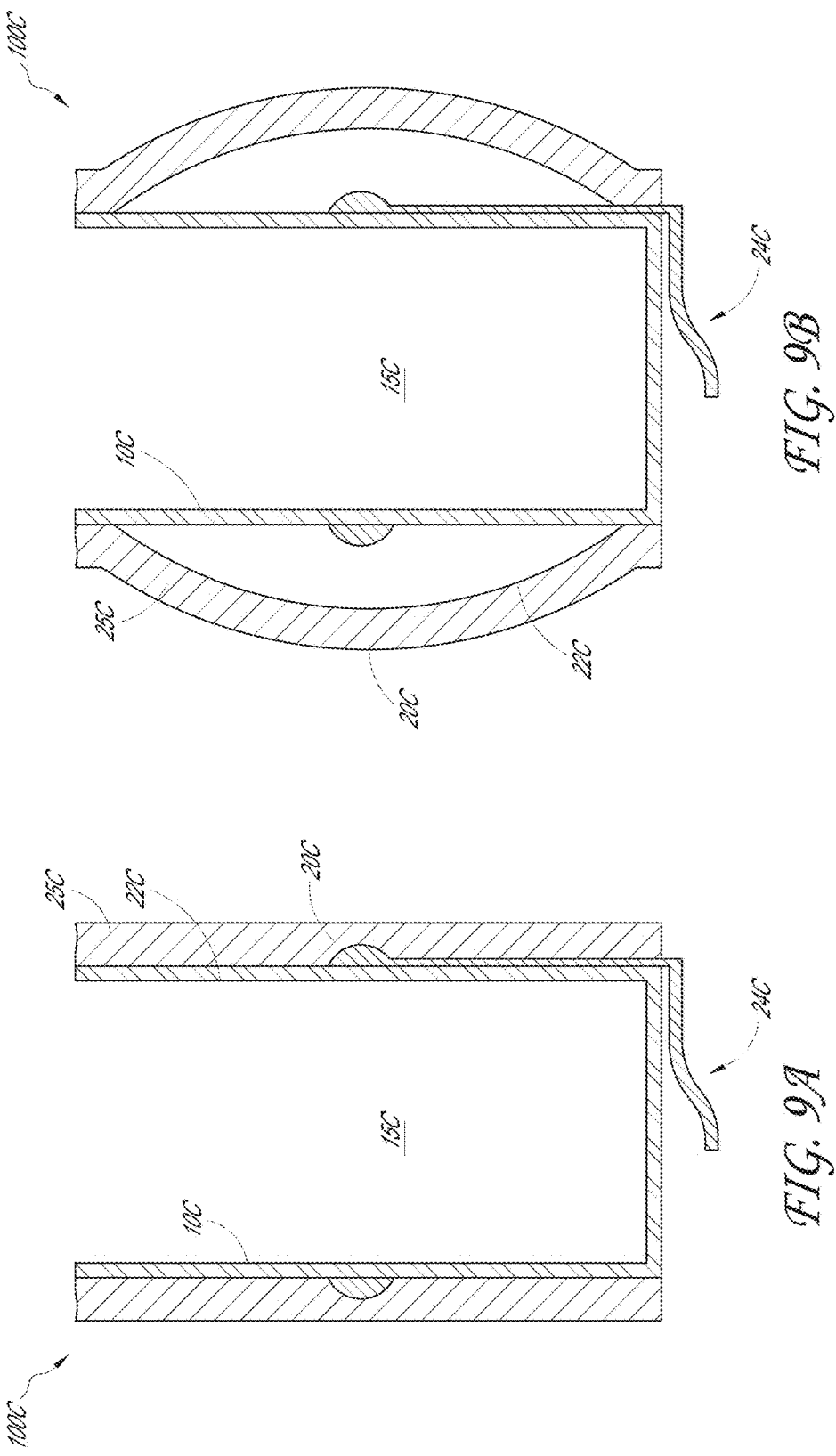
FIG. 9A is a schematic view of one embodiment of a structure of a drinkware container in a first state.
FIG. 9B is a schematic view of the structure of FIG. 9A of the drinkware container in a second state.

FIGS. 9A-9B show another embodiment of a portion of a drinkware container 100C. Some of the features of the drinkware container 100C are similar to features of the drinkware container 100, 100' described above. Accordingly, references numerals used to designate the various features of the drinkware container 100C are identical to those used for identifying the corresponding features of the drinkware container 100, 100', except that a "C" has been added to the reference numeral. Therefore, the structure and description for the various features for the drinkware container 100, 100' is understood to apply to the corresponding features of the drinkware container 100C in FIGS. 9A-9B, except as described below.

In the illustrated embodiment, the drinkware container 100C can have an inner sidewall 10C that helps define a chamber 15C of the container 100C. The container 100C can also have a second sidewall 20C spaced from the inner sidewall 10C and a third sidewall 22C that is adjacent the inner sidewall 10C in FIG. 9A, where a chamber between the second and third sidewalls 20C, 22C contain a phase change material (PCM) 25C. The container 100C can also have a separation mechanism 24C operable to separate the third sidewall 22C from the inner sidewall 10C to adjust a cooling performance provided by the PCM 25C to the liquid poured into the chamber 15C. In one embodiment, the separation mechanism 24C can be a mechanical device, such as a wedge that is slid between the inner sidewall 10C and third sidewall 22C to move the third sidewall 22C, and therefore the PCM 25C, away from the inner sidewall 10C. In another embodiment, the separation mechanism 24C can be a pneumatic system that introduces a gas (e.g., air) between the inner sidewall 10C and the third sidewall 22C to move the third sidewall 22C, and therefore the PCM 25C, away from the inner sidewall 10C. However, the separation mechanism 24C can be other suitable types (e.g., hydraulic, magnetic, etc.). In one embodiment, the separation mechanism 24C can be actuated by the control circuitry 80C of the container 100C. Advantageously, actuation of the separation mechanism 24C can preserve the life of the one or more power storage elements 60C by preventing the liquid poured into the chamber 15C from dropping in temperature (e.g., due to the PCM 25C), thereby allowing the one or more heating elements 40C to direct heat to the liquid to raise its temperature to the user selected temperature. For example, when a liquid is poured into the chamber 15C, a temperature sensor (e.g., one of the sensors 16C) will sense the temperature of the liquid. If the sensed temperature is below a threshold temperature, the control circuitry 80C will actuate the separation mechanism 24C to move the PCM 25C away from the inner sidewall 10C to inhibit further drop in temperature of the liquid via the action of the PCM 25C, which the one or more power storage elements 60C would then have to power the one or more heating elements 40C to recover. Accordingly, actuation of the separation mechanism 24C advantageously allows the container 100C to operate more efficiently (e.g., by preserving power of the one or more power storage elements 60C) and allows the control circuitry 80C to provide faster and more accurate temperature control (e.g., because a liquid poured in at a temperature below a threshold temperature would not need to be further cooled before heat is applied to raise its temperature to the user selected temperature).

In one embodiment, the control circuitry 80 can include a memory that stores information associated with the operation of the drinkware container 100, 100', 100B, 100C. Such information can include a preselected temperature or temperature range to which the one or more heating elements 40 is to operate in the absence of a user input temperature set point (e.g., via the interface UI1 on the container 100, 100', 100B, 100C or the interface UI2 on the mobile electronic device ED). The information can also include one or more previously selected temperature set points; for example, if the user selects a temperature set point for one beverage, the temperature set point can be stored into the memory and used as the initial set point for a subsequent beverage consumed by the user. If the user adjust the temperature set point for the subsequent beverage, then that adjusted temperature set point is stored in the memory for us on a subsequent beverage consumption. In another embodiment, the memory can store a plurality of temperature set points at the same time (e.g., one for coffee, one for tea, one for hot chocolate) and the control circuitry 80 can control the operation of the one or more heating elements 40 to heat the liquid to the appropriate temperature set point (e.g., via input from the user on what the beverage poured into the container 100, 100', 100B, 100C is or via one or more sensors, such as sensors 16, that sense a quality, such as pH, of the beverage poured into the container 100, 100', 100B, 100C and associate the sensed quality with a particular temperature set point).

In one embodiment, the memory can store thermal history information of the container 100, 100', 100B, 100C. For example, the memory can store, among others, sensed temperature information versus time (e.g., using a real time clock of the control circuitry 80), allowing the control circuitry 80 to determine a melt status of the PCM 25 and adjust operation of the one or more heating elements 40 (e.g., the time at which to turn the one or more heating elements 40 on) based at least in part on the melt status of the PCM 25, thereby advantageously providing faster and more accurate temperature control of the container 100, 100', 100B, 100C. When sensed information indicates the container 100, 100', 100B, 100C has not been used for a certain period of time to drink a beverage (e.g., overnight), the PCM 25 can be determined to have normalized to an ambient condition (e.g., solidified) and the control circuitry 80 can control the operation of the one or more heating elements 40 (e.g., the start time for the heating process) based on this determination for a beverage poured into the container 100, 100', 100B, 100C following said certain period of time. However, depending on factors such as the time the subsequent beverage is consumed, ambient temperature, whether the lid was left off the container 100, 100', 100B, 100C, the last set point temperature used, the melt status of the PCM 25 at the time of the subsequent beverage consumption may differ significantly from its ambient (e.g., solidified) condition. Therefore, the control circuitry 80 can adjust the operation (e.g., time of actuation) of the one or more heating elements 40 for the subsequent beverage consumption based at least in part on the determined melt status of the PCM 25 to advantageously optimize the temperature control of the container 100, 100', 100B, 100C and to achieve the desired beverage temperature for the subsequent beverage consumption more quickly and accurately. Such control will also advantageously optimize the operation of the one or more power storage elements PS, such as the power storage elements 60, thereby reducing wear of the power storage elements PS, 60.

Figure 10:
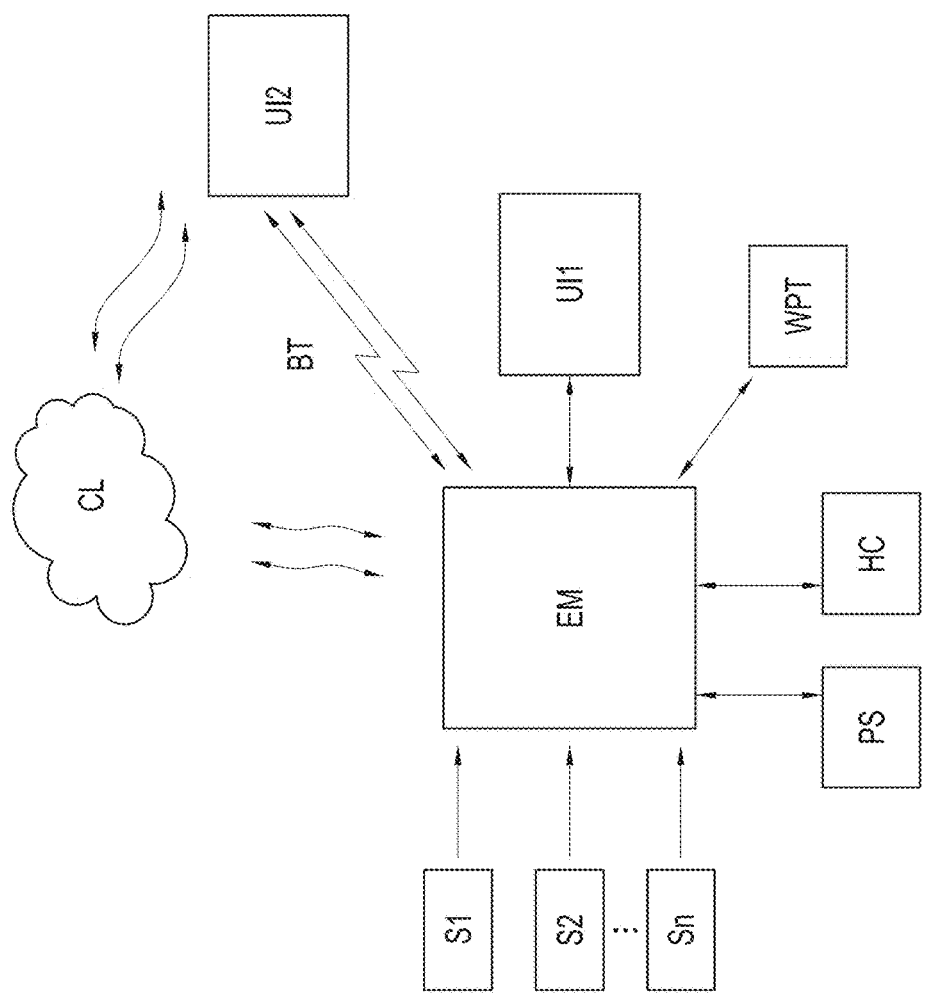
FIG. 10 is a schematic block diagram showing communication between an electronic module of the drinkware container and a remote electronic device.

FIG. 10 shows a block diagram of a communication system for an electronic module EM of the container 100, 100', 100B, 100C described herein. In the illustrated embodiment, the electronic module EM, which can include the control circuitry 80, can receive sensed information from one or more sensors S1-Sn (e.g., liquid level sensors, liquid volume sensors, temperature sensors, battery charge sensors, capacitance sensors, tilt sensors or gyroscopes), which can include the one or more sensor 16. The electronic module EM can also receive information from and transmit information (e.g., instructions) to one or more heating elements (or cooling elements or heating/cooling elements) HC, such as the elements 40 (e.g., to operate each of the heating elements in a heating mode, turn off, turn on, vary power output of, etc.) and optionally to one or more power storage devices PS, such as the power storage elements 60 (e.g., batteries, such as to charge the batteries or manage the power provided by the batteries to the one or more heating or cooling elements). The electronic module EM can also communicate with a wireless transmitter WPT (e.g., a wireless power transmitter, such as an inductive power transmitter) optionally of the container 100, 100'. The electronic module EM can also communicate with (e.g., transmit information to and receive information, such as user instructions like temperature set points from) a user interface UI1 on the container 100, 100' (e.g., on the body of the container 100, 100'). The electronic module EM can also communicate with an electronic device ED (e.g., a mobile electronic device such as a mobile phone, PDA, tablet computer, laptop computer, electronic watch; or a desktop computer) via the cloud CL or via a wireless communication system such as Bluetooth BT. The electronic device ED can have a user interface UI2, that can display information associated with the operation of the container 100, 100', 100B, 100C (as disclosed herein), and that can receive information (e.g., instructions, such as user selected temperature for the liquid in the container) from a user and communicate said information to the container 100, 100', 100B, 100C (as disclosed herein).

The term "electronic module" is meant to refer to electronics generally. Furthermore, the term "electronic module" should not be interpreted to require that the electronics be all in one physical location or connected to one single printed circuit board (PCB). One of skill in the art will recognize that the electronic module or electronics disclosed herein can be in one or more (e.g., plurality) of separate parts (coupled to one or a plurality of PCBs) and/or located in different physical locations of the container 100, 100', 100B, 100C as disclosed herein. That is, the electronic module or electronics can have different form factors.

Sensors

With respect to any of the containers 100, 100', 100B, 100C disclosed above, one or more sensors S1-Sn can be provided. In some embodiments, at least one sensor S2 of the one or more sensors S1-Sn can sense a liquid level (or information indicative of a liquid level) in a chamber 15, 15B, 15C of the container 100, 100', 100B, 100C.

In one embodiment, the sensor S2 can be a load cell that can sense a weight of the container 100, 100', 100B, 100C. The electronic module EM of the container 100, 100', 100B, 100C can receive the sensed weight information and compare it against a reference weight data (e.g., previously sensed when the container was empty and/or that is stored in a memory of the electronic module EM), and calculate a volume or level of the liquid in the container 100, 100', 100B, 100C (e.g., using an algorithm to convert the sensed weight information to liquid volume or level measurement).

In another embodiment, the sensor S2 can be a pressure sensor on a portion of the chamber 15, 15B, 15C of the container 100, 100', 100B, 100C and can sense a hydrostatic pressure of the liquid in the chamber 15, 15B, 15C. The electronic module EM can calculate a liquid volume or level based at least in part on the sensed pressure information from the sensor S2.

In another embodiment, the sensor S2 can be a capacitance sensor (e.g., capacitance sensing strip) that extends along at least a portion of the length of a sidewall of the container 100, 100', 100B, 100C. The sensor S2 can sense a capacitance of a liquid in the container 100, 100', 100B, 100C relative to a capacitance of air above the liquid level and communicate the sensed information to the electronic module EM, which can provide a measurement of liquid volume or liquid level in the container 100, 100', 100B, 100C based on the sensed information. In another embodiment, the sensor S2 can sense a conductivity of the liquid or air proximate the sensor and the electronic module EM can provide a measurement of liquid level or volume based at least in part on the sensed information.

In another embodiment, the sensor S2 can be an ultrasonic sensor on a sidewall of the container 100, 100', 100B, 100C. The sensor S2 can use a pulse-echo or wall resonance (e.g. resonance of the sidewall of the container 100, 100', 100B, 100C) to sense information indicative of a liquid level in the container. For example, the sensor S2 can sense a time it takes for pulse emitted by the sensor S2 into the chamber 15, 15B, 15C of the container 100, 100', 100B, 100C to return to the sensor (e.g., once it bounces from the liquid level location). The sensor S2 can transmit the sensed information to the electronic module EM, which can provide a measurement of liquid volume or liquid level in the container based on the sensed information.

In another embodiment, the sensor S2 can be an accelerometer or tilt sensor (e.g., gyroscope). The sensor S2 can sense an orientation (or change in orientation) of the container 100, 100', 100B, 100C and communicate the sensed orientation information to the electronic module EM. The electronic module EM can estimate a liquid level in the container 100, 100', 100B, 100C based on the sensed orientation information (e.g., using an algorithm that correlates a tilt angle to a liquid level). For example, if the sensor S2 senses an orientation of less than a first threshold (e.g., less than 30 degrees from an upright position) when a user has the container 100, 100', 100B, 100C against their lips (e.g., sensed via a sensor on the container lip or lid, such as a contact sensor, temperature sensor, etc.) then the electronic module estimates the liquid level to be about full, and if the sensor S2 senses an orientation greater than a second threshold (e.g., greater than 90 degrees from an upright position) when a user has the container against their lips (e.g., sensed via a sensor on the container lip or lid, such as a contact sensor, temperature sensor, etc.) then the electronic module estimates the liquid level to be about empty, and the electronic module EM can use an algorithm to interpolate between the two thresholds to infer intermediate liquid levels of the container (e.g., half full, quarter full, etc.).

In another embodiment, the sensor S2 can be a light sensor that measures light attenuation through the liquid and provides the sensed information to the electronic module EM, which can provide a measurement of liquid volume or liquid level in the container based on the sensed information (e.g., using an algorithm to correlate light attenuation with liquid volume or level).

In another embodiment, liquid level in the container 100, 100', 100B, 100C is measured based on sensed temperature (or information indicative of temperature) from one or more (e.g., a plurality of) temperature sensors S3, like the sensors 16. In one embodiment, the one or more sensors S3 can sense how long it takes the temperature to increase a reference number of degrees (e.g., 1 degree F. or 1 degree C.) when the chamber 5 of the container 100, 100', 100B, 100C is full of liquid to provide a first reference time, and the first reference time can be stored in a memory (e.g., a memory of the electronic module EM). Optionally, additional reference times can be provided by the one or more sensors S3 when the chamber 15 of the container 100, 100', 100B, 100C has other volumes of liquid therein (e.g., half full, ¾ full) and the reference times stored in said memory. During operation of the container, the one or more temperature sensors S3 can measure how long it takes for the temperature in the chamber to change by said reference number of degrees and communicate the sensed time information to the electronic module EM, which can provide a measurement of liquid volume or liquid level in the container based on the sensed time information, for example, based on an algorithm correlating time versus liquid volume or level. In one embodiment, the sensed time information is compared against one or more of the reference times and the liquid level or volume interpolated between the level or volume values corresponding to the reference times. Optionally, the algorithm can calculate the liquid volume or level based at least in part on sensed ambient temperature (e.g., from a sensor S4), to account for variations in how long it takes the temperature to increases by the reference number of degrees depending on ambient temperature (e.g., at high altitude, low altitude, in winter, in summer, etc.). Use of the one or more temperature sensor S3 therefore advantageously allows measurement of temperature and liquid level in the container with one sensor instead of requiring a separate sensor to measure liquid level, which provides for a simpler and less costly system. In another embodiment, the container 100, 100', 100B, 100C can have a plurality of temperature sensors S3 along the length of the container 100, 100', 100B, 100C and the liquid level in the chamber 15 of the container 100, 100', 100B, 100C can be determined by the electronic module EM by comparing the sensed temperature readings from the plurality of temperature sensors S3 (e.g., estimating that the liquid level is at a location between two adjacent temperature sensors where the temperature readings from said adjacent temperature sensors vary by more than a certain amount).

Though the features disclosed above may be described in connection with the container 100, 100', 100B, 100C, such as a mug, one of skill in the art will recognize that any of the features described in this embodiment can also apply to any drinkware, dishware, serverware, and storage container (e.g., cup, travel mug, baby bottle, sippy cup, thermos, water bottle, such as a reusable water bottle, carafe, soup container, bowl, plate, platter, food storage containers, such as Tupperware® containers, lunch boxes). As used herein "beverage" in understood to mean any consumable liquid (e.g., water, coffee, tea, soup, hot chocolate, etc.). Also, the drinkware or beverage containers disclosed herein are understood to also receive solid or semi-solid, or blended food.

While certain embodiments of the inventions have been described, these embodiments have been presented by way of example only, and are not intended to limit the scope of the disclosure. Indeed, the novel methods and systems described herein may be embodied in a variety of other forms. For example, though the features disclosed herein are described for drinkware containers, the features are applicable to containers that are not drinkware containers (e.g., plates, bowls, serverware, food storage containers) and the invention is understood to extend to such other containers. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Though the features and ideas disclosed above may be related to actively heating or cooling food or beverage, the embodiments above may also be used to heat or cool air spaces, such as refrigeration devices, cold boxes, coolers, portable coolers, or portable refrigerators, or hot boxes, or warmer drawers, or heat chambers, or any other device that would benefit from the heating or cooling of the air within a defined cavity or chamber.

The term "electronic module" is meant to refer to electronics generally. Furthermore, the term "electronic module" should not be interpreted to require that the electronics be all in one physical location or connected to one single printed circuit board (PCB). One of skill in the art will recognize that the electronic module or electronics disclosed herein can be in one or more (e.g., plurality) of separate parts (coupled to one or a plurality of PCBs) and/or located in different physical locations of the body of the container, as disclosed herein. That is, the electronic module or electronics can have different form factors.

Of course, the foregoing description is that of certain features, aspects and advantages of the present invention, to which various changes and modifications can be made without departing from the spirit and scope of the present invention. Moreover, the heated or cooled drinkware need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed containers.

What is claimed is:

1. A beverage container with active temperature control, comprising:
    a body having a chamber configured to receive and hold a beverage; and
    a temperature control system, comprising
        a phase change material (PCM) in thermal communication with at least a portion of the chamber, the phase change material configured to transition from one phase to a second phase to remove heat from a liquid disposed in the chamber that has a temperature above a temperature of the phase change material to lower the temperature of the liquid,
one or more heating elements in thermal communication with at least a portion of the chamber,
control circuitry configured to control an operation of the one or more heating elements,
one or more power storage elements configured to power one or both of the control circuitry and one or more heating elements; and
one or more sensors configured to sense a parameter of the liquid or operating parameter of the temperature control system,
wherein the control circuitry is configured to turn off or turn on, or increase power to or decrease power to the one or more heating elements such that a temperature of the liquid approaches a predetermined temperature.

2. The container of claim 1, wherein the predetermined temperature is a user selected temperature.

3. The container of claim 1, wherein the predetermined temperature is a previously selected temperature stored in a memory of the container.

4. The container of claim 1, further comprising a wireless communication transmitter or receiver to wirelessly communicate with a remote electronic device to one or both of wirelessly transmit information to the remote electronic device and wirelessly receive information from remote electronic device.

5. The container of claim 4, wherein the one or more sensors comprises one or both of an accelerometer and a tilt sensor configured to sense when the body tips over and to communicate a tipping signal to the control circuitry, the wireless communication transmitter configured to communicate a signal to the remote electronic device indicative of the body tipping over.

6. The container of claim 4, wherein the wireless receiver is configured to receive currency information or operating temperature information from the remote electronic device and to electronically transfer said currency information to a merchant point of sale location to complete a purchase.

7. The container of claim 6, wherein prior to electronically transferring said currency information to the merchant the currency information is stored in a memory of the container.

8. The container of claim 6, wherein the currency information is displayed in a user interface of the container.

9. The container of claim 4, wherein an outer surface of the container is defined by an electronic ink shell operable by the control circuitry to illustrate a user selected skin or logo design.

10. The container of claim 9, wherein the user selected skin is communicated from the remote electronic device to the container via the wireless receiver.

11. The container of claim 1, further comprising a timer and a computer memory configured to store information from at least one of the one or more sensors indicative of a thermal history of the operation of the temperature control system, the control circuitry configured to determine a melt status of the PCM based on said thermal history information and to operate the one or more heating elements based at least in part on said melt status of the PCM.

12. The container of claim 1, wherein when a predetermined temperature setpoint is greater than an equilibrium temperature of the PCM by more than a threshold amount, the control circuitry is configured to operate the one or more heating elements to add heat to the liquid before a sensed liquid temperature drops below the predetermined temperature setpoint.

13. The container of claim 1, wherein the one or more heating elements comprise a heater coil, the control circuitry configured to switch power to the heater coil on and off such that an inductance of the heater coil limits a current delivered to the heater coil, thereby inhibiting a temperature of the heater coil from increasing above a maximum target temperature.

14. The container of claim 1, further comprising one or more electrical leads in communication with the PCM, the control circuitry configured to apply a voltage or current to the PCM via the one or more electrical leads to vary a thermal conductivity of the PCM.

15. The container of claim 1, further comprising a separation mechanism actuatable to move the PCM away from thermal communication with the chamber, the control circuitry configured to actuate the separation mechanism to move the PCM away from the chamber to inhibit the PCM from lowering a temperature of the liquid.

16. A beverage container with active temperature control, comprising:
a body having a chamber configured to receive and hold a beverage;
a temperature control system, comprising
means for passively cooling at least a portion of the chamber to cool a liquid disposed in the chamber,
one or more heating elements in thermal communication with at least a portion of the chamber,
control circuitry configured to control an operation of the one or more heating elements,
one or more power storage elements configured to provide electrical energy to one or both of the control circuitry and one or more heating elements, and
one or more sensors configured to sense a quality of the liquid or operating parameter of the temperature control system, and
a wireless communication transmitter or receiver to wirelessly communicate with a remote electronic device to one or both of wirelessly transmit information to the remote electronic device and wirelessly receive information from remote electronic device,
wherein said means removes heat from a liquid disposed in the chamber that has a temperature above a predetermined temperature to lower the temperature of the liquid toward the predetermined temperature, and wherein the control circuitry is configured to turn off or turn on, or increase power to or decrease power to the one or more heating elements to maintain the temperature of the liquid at approximately said predetermined temperature or increase the temperature of the liquid above said predetermined temperature.

17. The container of claim 16, wherein said means comprises a phase change material that transitions from one phase to another phase.

18. The container of claim 16, further comprising one or more electrical contacts on an outer surface of the body configured to contact one or more electrical contacts on a charging base.

19. The container of claim 16, wherein the one or more sensors comprises one or both of an accelerometer and a tilt sensor configured to sense when the body tips over and to communicate a tipping signal to the control circuitry, the wireless communication transmitter configured to communicate a signal to the remote electronic device indicative of the body tipping over.

20. The container of claim 16, wherein the wireless receiver is configured to receive currency information from the remote electronic device and to electronically transfer said currency information to a merchant point of sale location to complete a purchase.

21. The container of claim 20, wherein prior to electronically transferring said currency information to the merchant the currency information is stored in a memory of the container.

22. The container of claim 20, wherein the currency information is displayed in a user interface of the container.

23. The container of claim 16, wherein an outer surface of the container is defined by an electronic ink shell operable by the control circuitry to illustrate a user selected skin or logo design.

24. The container of claim 23, wherein the user selected skin is communicated from the remote electronic device to the container via the wireless receiver.

25. The container of claim 16, further comprising a timer and a computer memory configured to store information from at least one of the one or more sensors indicative of a thermal history of the operation of the temperature control system, the control circuitry configured to determine a melt status of the PCM based on said thermal history information and to operate the one or more heating elements based at least in part on said melt status of the PCM.

26. The container of claim 16, wherein when a predetermined temperature setpoint is greater than an equilibrium temperature of the PCM by more than a threshold amount, the control circuitry is configured to operate the one or more heating elements to add heat to the liquid before a sensed liquid temperature drops below the predetermined temperature setpoint.

27. The container of claim 16, wherein the one or more heating elements comprise a heater coil, the control circuitry configured to switch power to the heater coil on and off such that an inductance of the heater coil limits a current delivered to the heater coil, thereby inhibiting a temperature of the heater coil from increasing above a maximum target temperature.

28. The container of claim 16, further comprising one or more electrical leads in communication with the PCM, the control circuitry configured to apply a voltage or current to the PCM via the one or more electrical leads to vary a thermal conductivity of the PCM.

29. The container of claim 16, further comprising a separation mechanism actuatable to move the PCM away from thermal communication with the chamber, the control circuitry configured to actuate the separation mechanism to move the PCM away from the chamber to inhibit the PCM from lowering a temperature of the liquid.

* * * * *